(12) United States Patent
Hamada

(10) Patent No.: US 6,480,665 B1
(45) Date of Patent: Nov. 12, 2002

(54) DISC RECORDING METHOD AND DEVICE, DISC REPRODUCING METHOD AND DEVICE, AND RECORDING MEDIUM

(75) Inventor: Toshiya Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,700

(22) PCT Filed: Aug. 20, 1998

(86) PCT No.: PCT/JP98/03693

§ 371 (c)(1),
(2), (4) Date: Jun. 7, 1999

(87) PCT Pub. No.: WO99/11063

PCT Pub. Date: Mar. 4, 1999

(30) Foreign Application Priority Data

Aug. 21, 1997 (JP) ............................................. 9-225241

(51) Int. Cl.[7] ................................................ H04N 5/93
(52) U.S. Cl. ............................ 386/52; 386/131; 386/55
(58) Field of Search ................................ 386/4, 33, 45, 386/52, 54–55, 64–65, 111–112, 125–126, 131; 360/13, 72.2; 369/83

(56) References Cited

U.S. PATENT DOCUMENTS 4,360,843 A * 11/1982 Menezes et al. ............ 360/72.2
6,091,886 A * 7/2000 Abecassis .................... 386/125
6,112,010 A * 8/2000 Koyama et al. ............. 386/126
6,134,379 A * 10/2000 LaMacchia ................... 386/54
6,154,601 A * 11/2000 Yaegashi et al. .............. 386/52

FOREIGN PATENT DOCUMENTS

JP         6-22277     1/1994
JP         8-186789    7/1996

* cited by examiner

Primary Examiner—Andrew Christensen
Assistant Examiner—Christopher Onuaku
(74) Attorney, Agent, or Firm—Frommer Lawrence & Haug LLP; William S. Frommer; Dennis M. Smid

(57) ABSTRACT

A method and an apparatus for recording a picture sequence on a disk-shaped recording medium at least on a picture by picture basis make it possible to record a picture sequence in a manner that allow picture management and time code allocation to be realized accurately and reliably when editing a picture sequence according MPEG, for example, by utilizing techniques such as cutting out (or erasing) a scene, inserting a scene (in the proper sense of the word) without overlaying the picture sequence with a scene and/or moving part of the picture sequence.

4 Claims, 21 Drawing Sheets

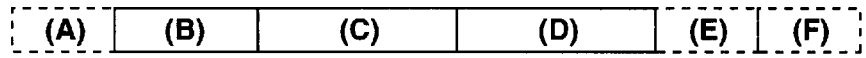
(A) ENTRY ADDRESS
(B) CUT (SCENE) NUMBER
(C) STARTING PICTURE NUMBER
(D) LENGTH (OR ENDING PICTURE NUMBER)
(E) POINTER TO PRECEDING ENTRY (PRECEDING ENTRY ADDRESS)
(F) POINTER TO SUCCEEDING ENTRY (SCCEEDING ENTRY ADDRESS)
FIG.3
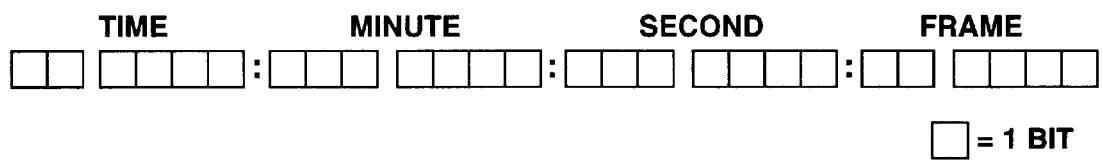
FIG.4
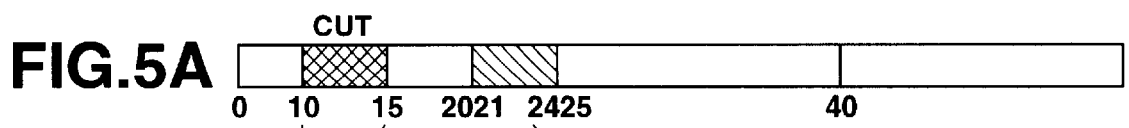
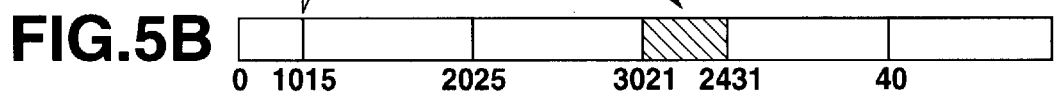

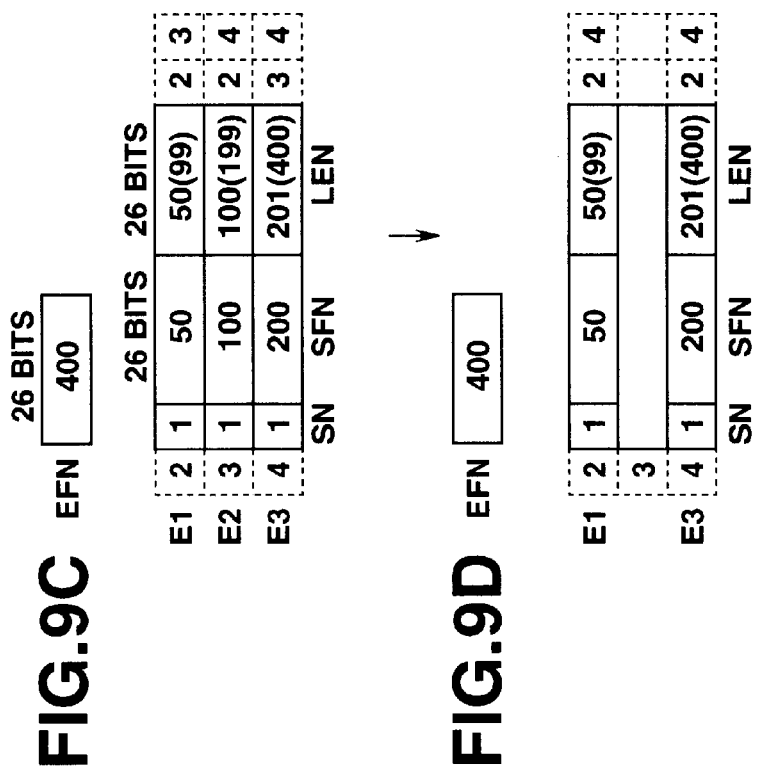
FIG.9C FIG.9D
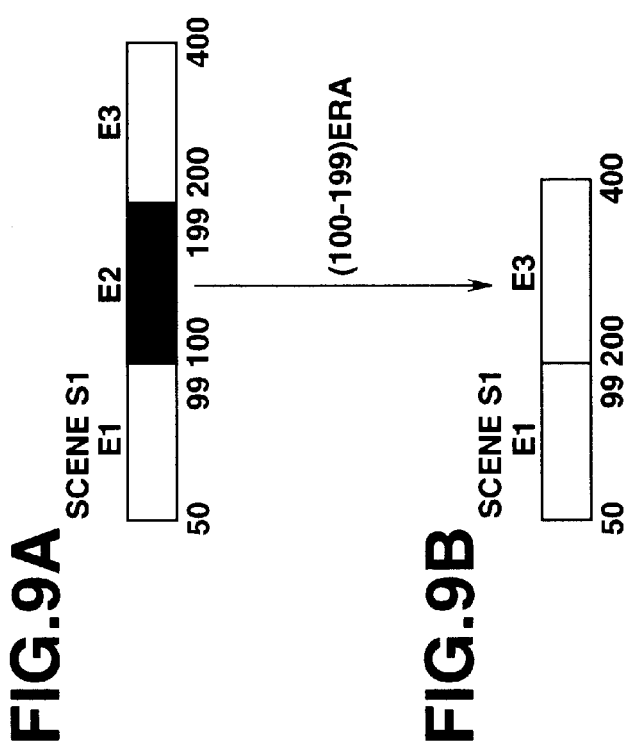
FIG.9A FIG.9B

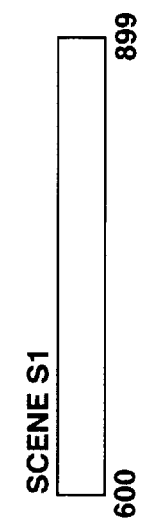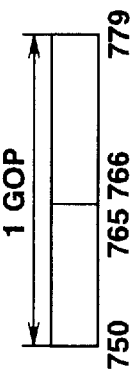

| | SCENE S1 | | SCENE S2 | | SCENE S3 | | SCENE S4 | | |
|---|---|---|---|---|---|---|---|---|---|
| 00:00 | 10:00 | 00:00 | 05:28 | 00:00 | 02:29 | 00:00 | 01:00 | TIME CODES OF EACH SCENE |
| 00:00 | 10:00 | 10:01 | 15:29 | 16:00 | 18:29 | 19:00 | 20:00 | THROUGH TIME CODES FOR ALL SCENES |

FIG.15

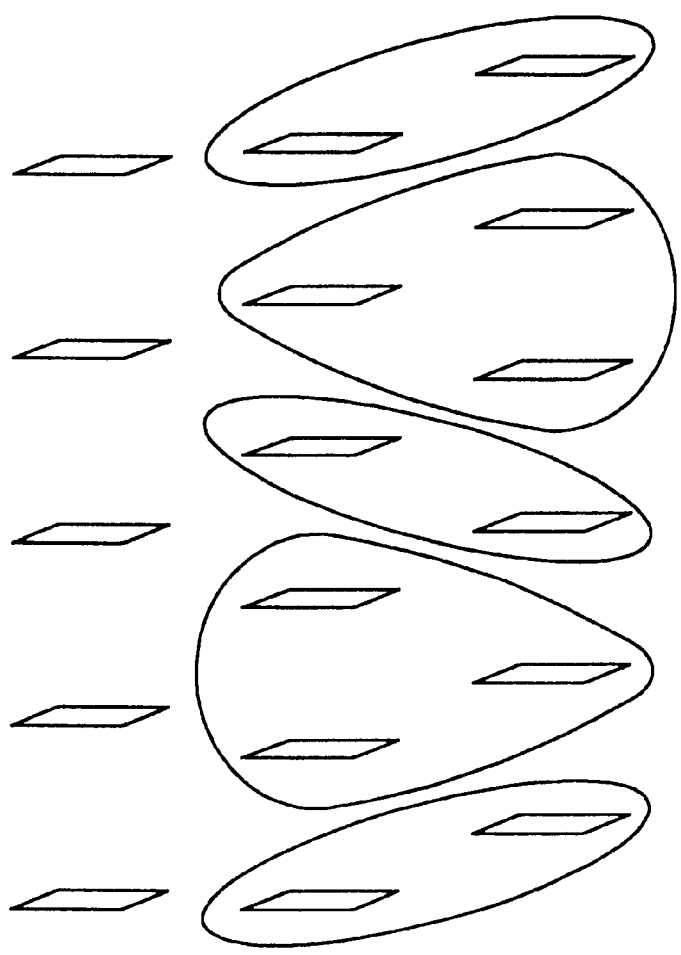
FIG.16A 24Hz PROGRESSIVE
FIG.16B FIELD FREQUENCY 60Hz (INTERLACE) TOP FIELD / BOTTOM FIELD

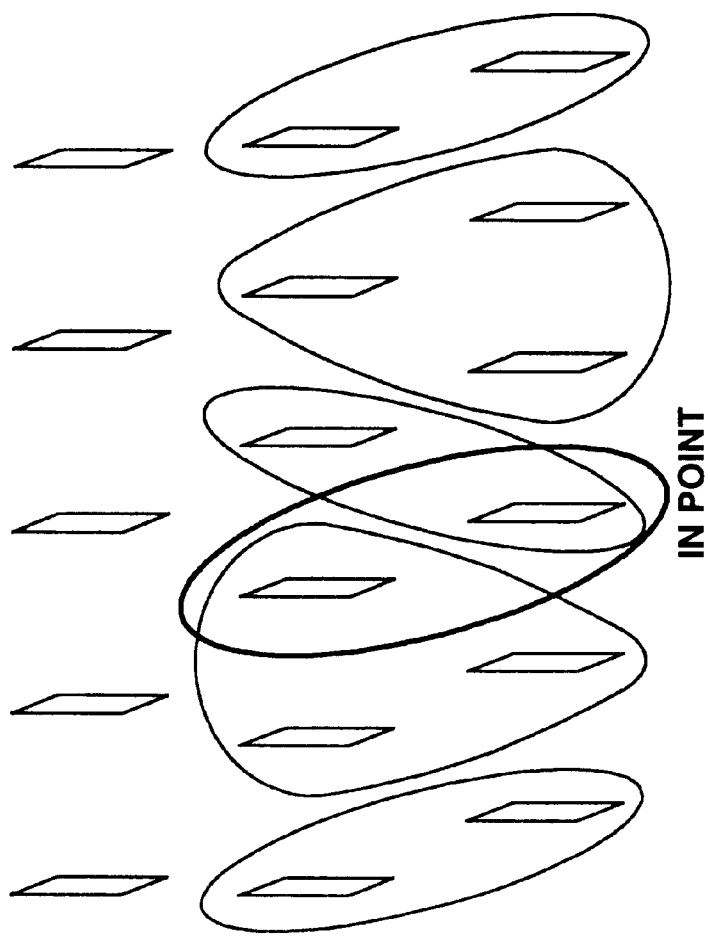
FIG.17A  24Hz PROGRESSIVE
FIG.17B  TOP FIELD
FIELD FREQUENCY 60Hz (INTERLACE)
BOTTOM FIELD

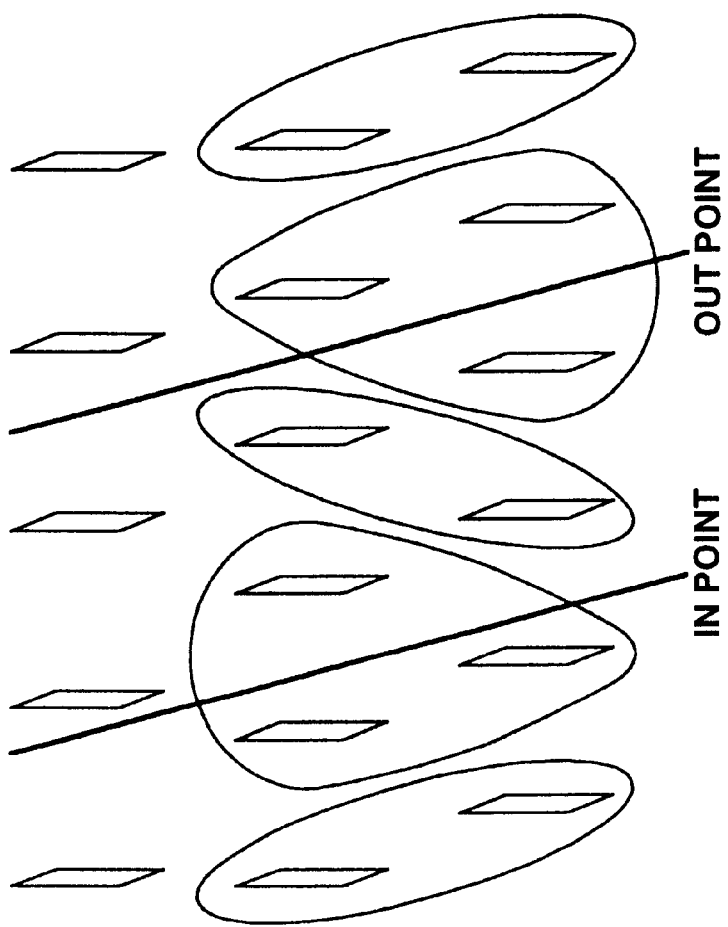
FIG.18A 24Hz PROGRESSIVE
FIG.18B TOP FIELD
FIELD FREQUENCY 60Hz (INTERLACE)
BOTTOM FIELD

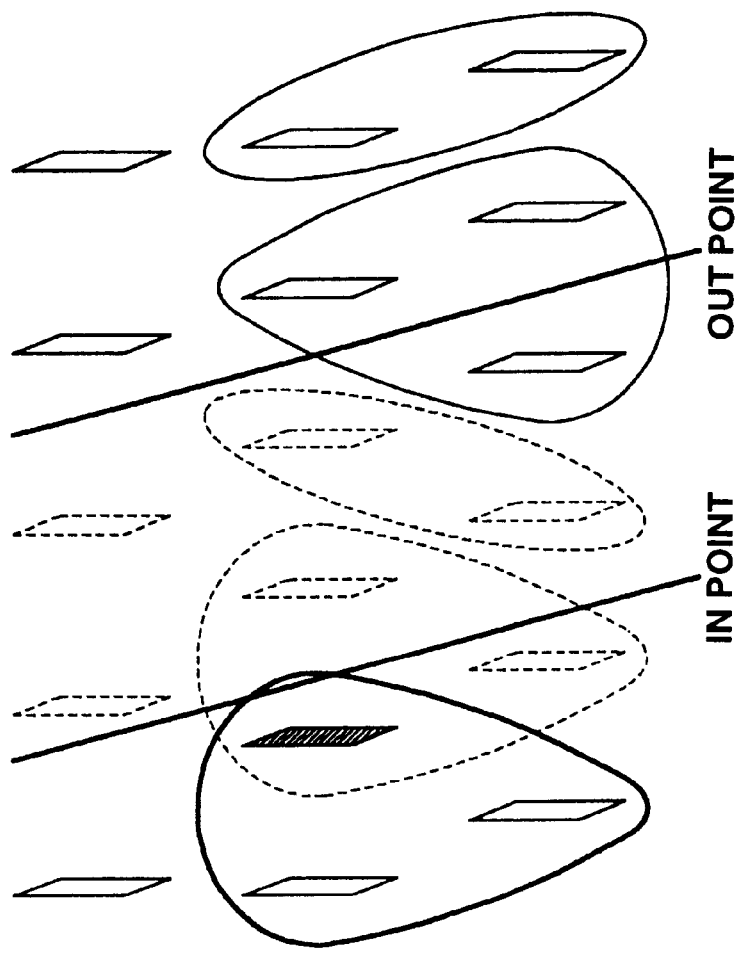
FIG.19A 24Hz PROGRESSIVE
FIG.19B TOP FIELD / FIELD FREQUENCY 60Hz (INTERLACE) / BOTTOM FIELD

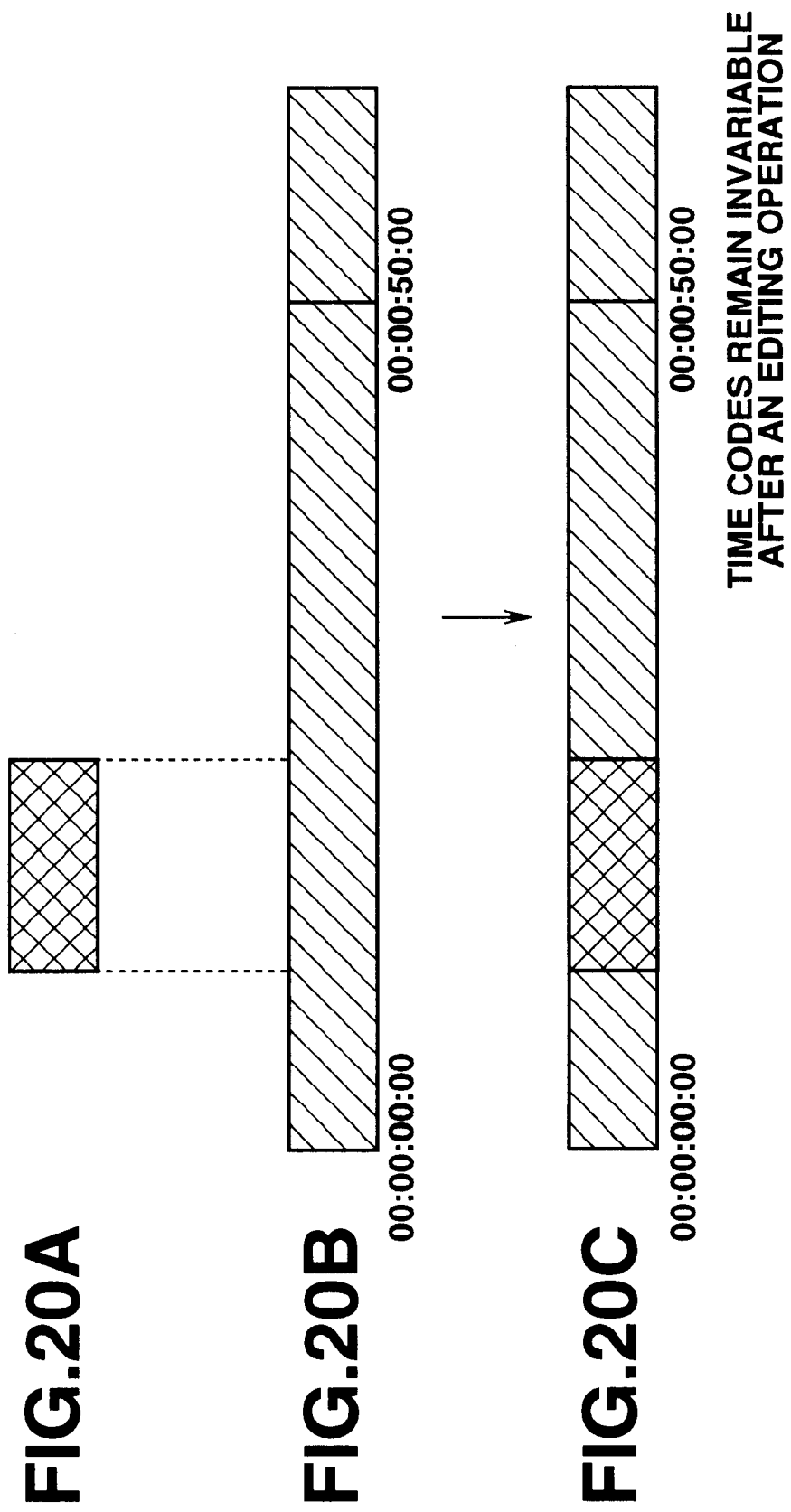

TIME CODES REMAIN INVARIABLE DURING AN EDITING OPERATION

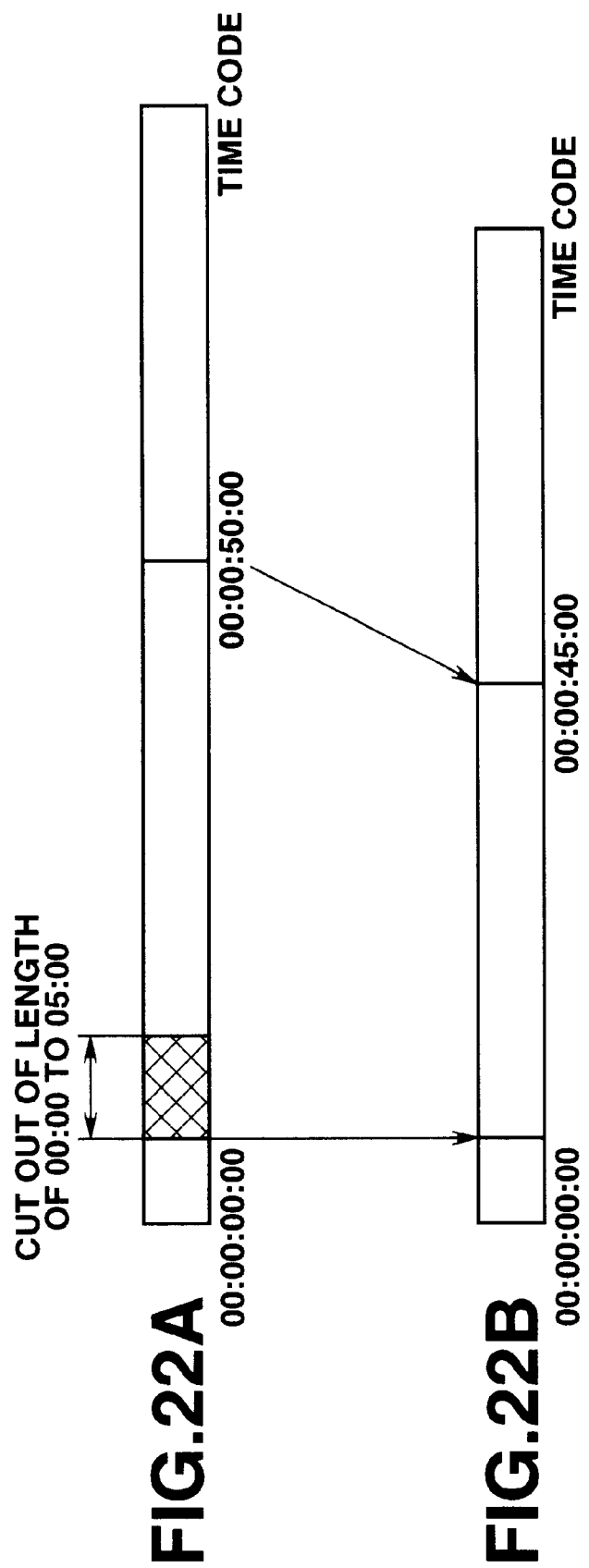

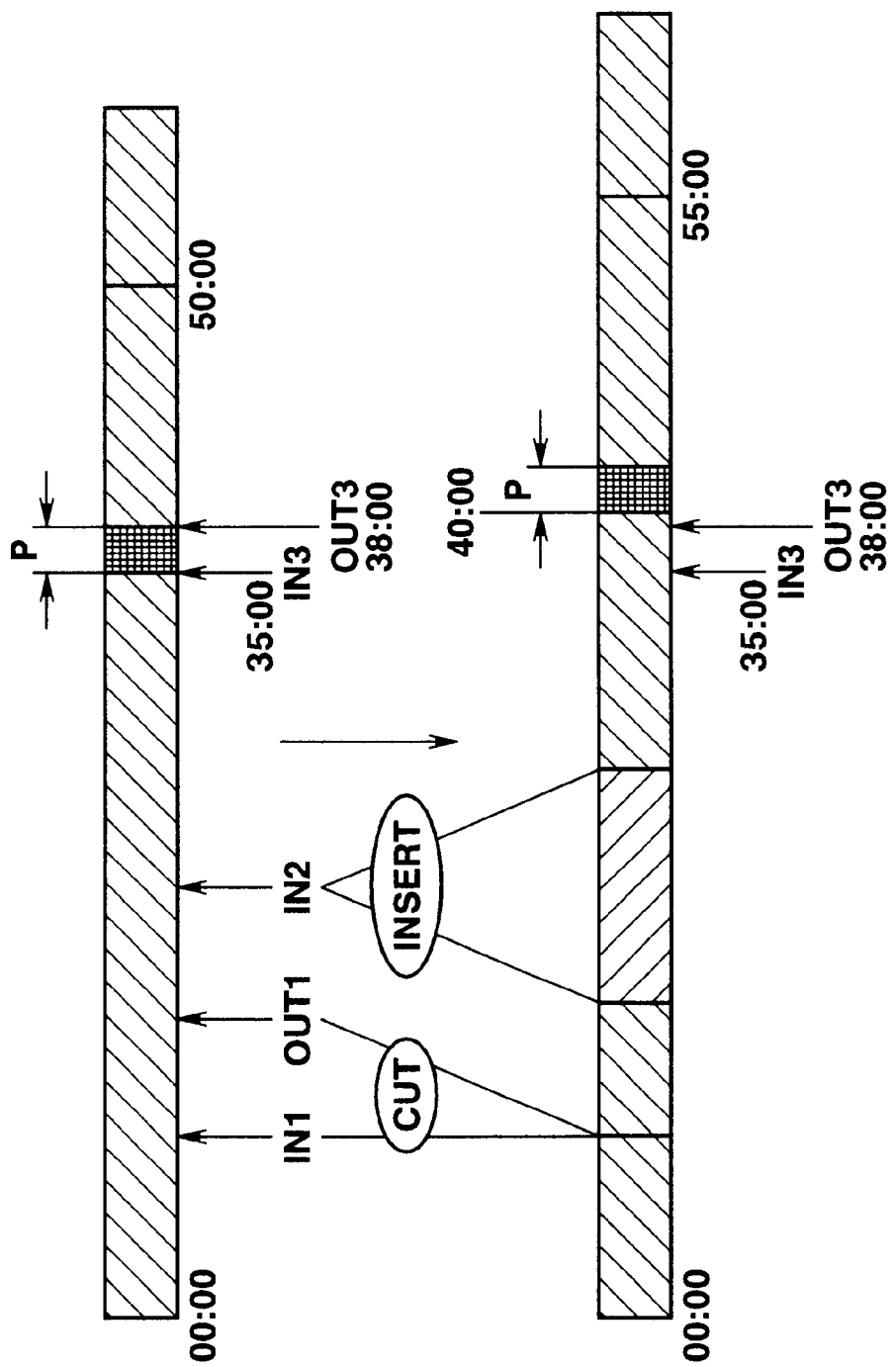

DISC RECORDING METHOD AND DEVICE, DISC REPRODUCING METHOD AND DEVICE, AND RECORDING MEDIUM

TECHNICAL FIELD

This invention relates to a method and an apparatus for recording pictures, or a picture sequence to be more accurate, on a disk-shaped recording medium at least on a picture by picture basis and to a method and an apparatus for reproducing, if partly, the pictures recorded on such a disk-shaped recording medium as well as to such a recording medium. More particularly, the present invention relates to a novel technology of picture management and time code allocation to be used for recording a picture sequence on a disk-shaped recording medium in an editing session.

BACKGROUND ART

Time codes normally used in the operation of recording video signals on a tape-shaped recording medium (hereinafter referred to as a tape media) are allocated to frames for one-to-one correspondence in order to make use of the intrinsic property of numbers as identifiers. Thus, any particular picture frame can unequivocally be identified by way of the corresponding time code because this relationship is absolute on the tape. Additionally, the time code assigned to a picture frame remains invariable on the tape media if any editing operations are conducted before and/or after the picture frame unless the picture frame is transferred onto some other tape. Thus, it is possible to specify a number of combinations (events) of an in-point (editing in-point) and an out-point (editing out-point) and carry out that number of editing operations in a single editing session.

FIG. 20 of the accompanying drawings schematically illustrates how a foreign scene is inserted into a picture sequence in an editing operation on a tape media with their time codes invariably accompanying the picture sequence. In FIG. 20, both (a) and (b) show respective picture sequences to be used for an editing operation and (c) in FIG. 20 shows a picture sequence obtained by inserting the picture sequence of (a) of FIG. 20 into the picture sequence (b) of FIG. 20 in the editing operation. Each of the expressions "00:00:00:00" and "00:00:50:00" in FIG. 20 represents a time code of hour:minute:second:frame. Thus, if the picture sequence (a) of FIG. 20 is laid on a corresponding part of the picture sequence (b) of FIG. 20, the edited picture sequence (c) of FIG. 20 carries the same and identical time codes.

FIG. 21 shows in-points and out-points arranged on a tape media. More specifically, (a) in FIG. 21 shows in-points and out-points arranged on a picture sequence and (b) in FIG. 21 shows a picture sequence obtained by inserting picture sequences, or foreign scenes, into the picture sequence of (a) in FIG. 21 respectively by referring to the in-points and the out-points of(a) in FIG. 21. It may be appreciated that a plurality of combinations (events) of an in-point and an out-point are arranged at a time for an editing session of FIG. 21. More specifically, FIG. 21 shows that a total of three combinations (events) of in-point IN1 and out-point OUT1 through in-point IN3 and out-point OUT3 are specified and the editing operations for the first two combinations (event of in-point IN1 and out-point OUT1 and that of in-point IN2 and out-point OUT2) have been executed. Again, each of the expressions "00:00: 00:00" and "00:00:50:00" in FIG. 21 represents a time code of hour:minute: second:frame. Thus, if a plurality of events are arranged on the picture sequence (a) of FIG. 21 and foreign scenes are laid on corresponding parts of the picture sequence (a) of FIG. 21, the edited picture sequence (b) of FIG. 20 carries the same and identical time codes. In other words, editing operations can be carried out successfully because the time codes on the tape media remain invariable throughout any editing sessions.

To summarize, the time code system of a tape media has the following functional features.

(1) The picture frames and the time codes have a relationship of one-to-one correspondence on the tape media.
(2) The relationship of (1) is maintained after any editing operations that may be conducted before and/or after a particular picture frame.
(3) The time codes are used to identify particular respective picture frames in editing sessions (not only by the user but also inside the editing equipment).
(4) The time codes notifies the user of the duration of time of picture reproduction from the head of the tape media (so that the remaining time that is available for reproducing picture frames from or recording picture frames on the tape media can be known).

It will be appreciated that the feature of searching out any desired particular picture frames by means of the time codes, or keys, allocated to the picture frames for one-to-one correspondence as described above by referring to a tape media may also be desirable for a disk-shaped medium (hereinafter referred to as a disk media).

On the other hand, the disk media is randomly accessible and hence has the following novel features that are specific to the disk media and not found in the tape media.

Firstly, the conventional tape media is not adapted to cutting out or erasing part of a bit stream of a picture sequence recorded on it. More specifically, it is not adapted to cutting out (or erasing) a particular scene recorded on it and having a certain length and connecting the preceding boundary and the succeeding boundary of the cut out (or erased) particular scene. To the contrary, it is possible to cut out or erase part of a bit stream of a picture sequence recorded on a disk media. If such an editing operation is to be carried out on a tape media, a blank tape and a tape recorder have to be brought in place in advance. Then, all the picture sequence following the particular scene has to be copied on the blank tape and copied back onto the original tape so as to make it directly connect with the end of the scene that immediately preceded the particular scene. It will be appreciated that this is a time consuming tedious operation. FIG. 22 schematically illustrates how a particular scene is cut out from a disk media. In FIG. 22, (a) shows a picture sequence and the shaded area from 00:00:00:00 to 00:00:05:00 represents the particular scene to be cut out. In FIG. 22, (b) shows the picture sequence obtained by cutting out the particular scene of (a) and connecting the preceding boundary and the succeeding boundary of the particular scene. With a disk media to be used for recording pictures, it is easy to cut out part of a picture sequence and connecting the front end and the rear end of the cut out part.

Secondly, with a technique referred to insertion editing used for the tape media, a particular scene is not inserted (in the proper sense of the word) into but laid on the picture sequence already recorded on the tape media. It is in fact an operation not of "inserting" a scene into a picture sequence but of partly "overlaying" a picture sequence with a scene. In the case of the disk media, to the contrary, it is possible to realize insertion editing (in the proper sense of the word) that is not an "overlaying" operation. In order (not to lay a scene on but) to insert a scene into a picture sequence already recorded on a tape media in an editing operation, a blank tape and a tape recorder have to be brought in place in advance as described above for cutting out a scene. Then, all the picture sequence that is to follow the particular scene to be inserted has to be copied on the blank tape and copied back onto the original tape after the particular scene is laid on the predetermined stretch of the tape so as to make it directly connect with the end of the scene that has been laid on the stretch. It will be appreciated that this is also a time consuming tedious operation.

Thirdly, with the disk media, it is easy to edit by moving part of a picture sequence because the disk media is adapted to cutting out part of a bit stream and inserting a scene (in the proper sense of the word) into a picture sequence without overlaying it with the scene. In other words, the operation of moving a particular scene in a picture sequence in an editing session is an operation of cutting out the scene from the picture sequence and inserting it into some other part of the picture sequence without overlaying it with the scene.

To summarize, the disk media has the following functional features that are not found in the tape media.
(A) A bit stream can be partly cut out and erased.
(B) It is possible to realize insertion editing (in the proper sense of the word) without overlaying, if partly, the picture sequence with a scene.
(C) A picture sequence can be partly moved.

On the other hand, when editing a picture sequence on a disk media, utilizing the time code (TC) system of the conventional tape media, the following problems appear.

Firstly, with a disk media where time codes are allocated to the picture frames, the time codes can give rise to a discontinuity when a bit stream thereon is partly cut out or erased by using the functional feature (A) above. Then, if the time codes that are found after the cut out (or erased) particular scene are reallocated to properly indicate the duration of time of picture reproduction from the head of the picture sequence (and remove the discontinuity of the time codes), the time codes will be modified after each editing operation to make it difficult to use them for identifying particular respective picture frames. If the time codes are not reallocated after the editing session, on the other hand, then any particular picture frames will be identified by using the time codes allocated to them respectively but it is no longer possible to tell the duration of time of picture reproduction from the head of the picture sequence because the time codes show discontinuity. In the case of the example of FIG. 22, it will be seen that the time code of 00:00:05:00 of (a) is modified to 00:00:45:00 as indicated by (b). All in all, if the time code system of the conventional tape media is applied to the disk media, the time codes can take only either one of the two roles they play on the tape media of
(i) identifying the particular respective picture frames and
(ii) telling the duration of time of picture reproduction.

Secondly, if the functional feature of (B) is utilized on a disk media for an editing operation of inserting a scene (in the proper sense of the word) into a picture sequence without overlaying the latter with the scene, there arises the problem of how to deal with the time codes for the picture frames of the scene inserted in the editing operation. If, for example, all the time codes are reallocated from the head of the picture sequence after the operation of insertion editing that does not overlay the picture sequence with a foreign scene, the time codes can recover the role of telling the duration of time of picture reproduction. Then, however, a problem will arise when a plurality of events are selected for an editing session as shown in FIG. 23, which illustrates how the relationship between the events and the time codes becomes distorted if the time codes are reallocated after each editing operation, which may be that of insertion editing or cutting out. In FIG. 23, (a) shows that a total of three combinations (events) of in-point IN1 and out-point OUT1 through in-point IN3 and out-point OUT3 are selected and (b) shows that the editing operations for the first two combinations (event of in-point IN1 and out-point OUT1 and that of in-point IN2 and out-point OUT2) have been executed and the time codes have been reallocated. Note that, in the example of FIG. 23, the event of in-point IN1 and out-point OUT1 is used to cut out a scene and the event of in-point IN2 and out-point OUT2 is used to insert a foreign picture sequence. Each of the expressions "00:00", "35:00" and "38:00" in FIG. 23 represents a time code of hour:minute. Thus, in the example of FIG. 23, as a result of reallocating the time codes after the editing operation using the second event, the third event (in-point IN3 and out-point OUT3) indicates a scene different from the one to be edited. More specifically, the time codes of in-point IN3 and out-point OUT3 of the selected third event are respectively 35:00 and 38:00, which define a stretch of P in (a) of FIG. 23 but the time code of in-point IN3 of the third event will be 40:00 when the time codes are reallocated after the first two editing operations, although the time codes of in-point IN3 and out-point OUT3 of the selected third event remain 35:00 and 38:00, which will then define a stretch that is totally different from the one selected in advance. Thus, while it is possible to realize insertion editing in the proper sense of the word on a disk media, the relationship between the selected events and the time codes will be distorted if the time codes are reallocated from the head after each editing operation in order to recover the role of the disk media of telling the duration of time of picture reproduction. In short, any attempt for providing the disk media with the roles of the time code system of the tape media results in the necessity of reallocating the time codes after each editing operation, which by turn can damage the functional features of the disk media.

Thirdly, since the time codes and the picture frames of a tape media show a relationship of one-to-one correspondence, which is maintained after any editing operations that may be conducted before and/or after a particular picture frame, the picture frames will always be reproduced in the ascending order of the time codes even if part of the picture sequence has been moved. With a disk media, to the contrary, while a picture sequence can be partly moved as pointed out by in (C) above, the picture frames may not necessarily be reproduced in the ascending order of the time codes after moving part of the picture sequence.

Thus, as discussed above, when editing a picture sequence on a disk media by simply applying the time code (TC) system of the conventional tape media, the following problems arise.
(1) The time codes show discontinuity after cutting out or erasing a bit stream.
(2) There arises a problem of reallocating the time codes for the scene inserted by insertion editing (in the proper sense of the word), which is not overlaying the picture sequence, if partly, with the scene.
(3) When a picture sequence is partly moved, the picture frames may not necessarily be reproduced in the ascending order of the time codes to give rise to a problem of how to handle the time codes after moving part of the picture sequence.

In view of the above circumstances, it is therefore the object of the present invention to provide a method and an apparatus for recording a picture sequence on a disk-shaped recording medium and to a method and an apparatus for reproducing, if partly, the picture sequence recorded on such a disk-shaped recording medium as well as to a recording medium to be used for recording a picture sequence that allow picture management and time code allocation to be realized accurately and reliably when editing a picture sequence by utilizing techniques such as cutting out (or erasing) a scene, inserting a scene (in the proper sense of the word) without overlaying the picture sequence with a scene and/or moving part of the picture sequence.

DISCLOSURE OF THE INVENTION

According to an aspect of invention, the above object is achieved by providing a method for recording a picture sequence on a disk-shaped recording medium at least on a picture by picture basis, comprising steps of allocating unique numbers to the pictures on the disk-shaped recording medium for one-to-one correspondence, providing a file of editing information apart from the physical addresses of the substantive data on the disk-shaped recording medium, editing the picture sequence by managing the numbers allocated to the respective pictures for one-to-one correspondence and recording the file of editing information on the disk-shaped recording medium.

According to another aspect of the invention, there is provided an apparatus for recording a picture sequence on a disk-shaped recording medium at least on a picture by picture basis, comprising a number allocation means for allocating unique numbers to the pictures of the disk-shaped recording medium for one-to-one correspondence and a file management means for managing a file of editing information apart from the physical addresses of the substantive data on the disk-shaped recording medium, the picture sequence being edited by managing the numbers allocated to the respective pictures for one-to-one correspondence, the file of editing information being recorded on the disk-shaped recording medium.

According to still another aspect of the invention, there is provided a method for reproducing a picture sequence recorded on a disk-shaped recording medium at least on a picture by picture basis, comprising steps of reading out a file of editing information from the disk-shaped recording medium apart from the physical addresses of the substantive data on the disk-shaped recording medium and reproducing, at least partly, the pictures having respective unique numbers allocated thereto for one-to-one correspondence and managed by using the file of editing information on the basis of the file of editing information.

According to still another aspect of the invention, there is provided an apparatus for reproducing a picture sequence recorded on a disk-shaped recording medium at least on a picture by picture basis, comprising a file reading means for reading out a file of editing information from the disk-shaped recording medium apart from the physical addresses of the substantive data on the disk-shaped recording medium and a reproduction control means for reproducing, at least partly, the pictures having respective unique numbers allocated thereto for one-to-one correspondence and managed by using the file of editing information on the basis of the file of editing information.

According to a further aspect of the invention, there is provided a disk-shaped recording medium for recording a picture sequence at least on a picture by picture basis, adapted to allocating unique numbers to the pictures on the disk-shaped recording medium for one-to-one correspondence, providing a file of editing information apart from the physical addressees of the substantive data on the disk-shaped recording medium and recording video signals edited by managing the unique numbers allocated to said pictures on said file of editing information along with said file of editing information.

Thus, according to the invention, it is now possible to record a picture sequence in a manner that allow picture management and time code allocation to be realized accurately and reliably when editing a picture sequence by utilizing techniques such as cutting out (or erasing) a scene, inserting a scene (in the proper sense of the word) without overlaying the picture sequence with a scene and/or moving part of the picture sequence. The numbers may be combinations of a plurality of numerals to make them hierarchical, serial numbers or any other numbers so long as they are unique relative to each other.

BRIEF DESCRIPTION OF THE DRAWINGS

FIG. 3 is schematic illustration of the format of an entry that can be used for the purpose of the invention.

FIG. 4 is a schematic illustration of a time code of hour:minute:second frame expressed in the form of BCD.

FIG. 5 schematically illustrates how editing operations are conducted on a disk.

FIG. 9 is a schematic illustration of an operation of erasing a scene of a picture sequence and the smallest table required for it.

FIG. 13 is a schematic illustration of an operation of preparing an entry for each GOP.

FIG. 15 is a schematic illustration of time code allocation in a basic reproduction mode.

FIG. 16 is a schematic illustration showing the relationship between frames and fields in 2-3 (or 3-2) pull-down processing.

FIG. 17 is a schematic illustration of a problem that arises when an editing operation is conducted at an in-point in 2-3 pull-down processing.

FIG. 18 is a schematic illustration showing how an original picture sequence of 24 frames/second is displayed on a frame by frame basis to specify respectively an in-point and an out-point at the corresponding original frames in 2-3 pull-down processing.

FIG. 19 is a schematic illustration how repeat_first_field of MPEG is made equal to 1 and repeated for a field for the frame preceding the in-point in order to maintain the field continuity after the editing operation when specifying an in-point and an out-point in 2-3 pull-down processing.

FIG. 20 is a schematic illustration showing how a scene is inserted on a tape-shaped recording medium.

FIG. 22 is a schematic illustration showing how a scene is cut out from a disk-shaped recording medium.

FIG. 23 is a schematic illustration showing how the relationship between the events and the time codes becomes distorted if the time codes are reallocated after each editing operation, which may be that of insertion editing or cutting out.

BEST MODE FOR CARRYING OUR THE INVENTION

Now, the present invention will be described by referring to the accompanying drawings that illustrate preferred embodiments of the invention.

Figure 1:
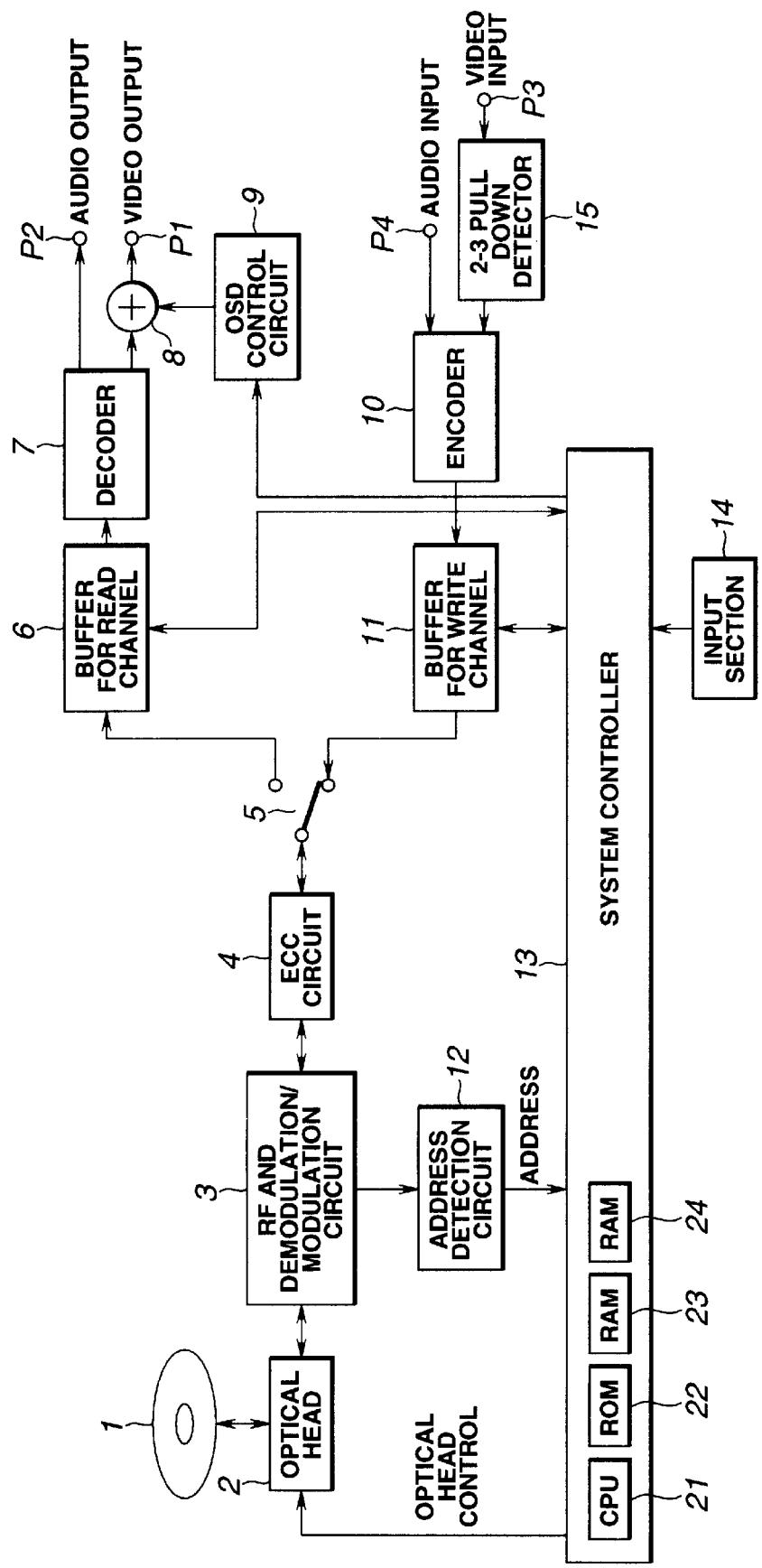
FIG. 1 is a schematic block circuit diagram of an optical disk apparatus provided as an embodiment of method and apparatus for recording a picture on a disk and method and apparatus for reproducing a picture from a disk according to the invention.

FIG. 1 is a schematic block circuit diagram of an optical disk apparatus provided as an embodiment of method and apparatus for recording a picture on a disk and method and apparatus for reproducing a picture from a disk according to the invention. Additionally, FIG. 1 shows an embodiment of disk-shaped recording medium according to the invention, which is an optical disk.

Referring to FIG. 1, the optical disk apparatus comprises an optical head 2 adapted to reading out data from and writing data onto a refreshable optical storage disk 1.

The bit stream read out from the optical disk 1 by means of the optical head 2 is demodulated by an RF and demodulation/modulation circuit 3 and then corrected for errors before forwarded to a read channel buffer 6 adapted to absorbing the difference between the data reading rate and the data decoding/processing rate by way of a switch 5. The output of the read channel buffer 6 is fed to decoder 7. The read channel buffer 6 is so designed that system controller 13 can read out data from and write data in it.

The bit stream output from the read channel buffer 6 is then decoded by the decoder 7 to produce video and audio signals therefrom. The video signal output from the decoder 7 is then entered to synthesizing circuit 8, where it is synthetically combined with the video signal output from OSD (on screen display) control circuit 9 before being output from output terminal P1 to a display (not shown) for displaying. The audio signal output from the decoder 7 is then sent to a loud speaker (not shown) from output terminal P2 for sound reproduction.

On the other hand, the video signal input from input terminal P3 and made to pass through 2-3 pull-down detection circuit 15 and the audio signal input from input terminal P4 are encoded by encoder 10 and sent to write channel buffer 11 adapted to absorbing the difference between the data encoding/processing rate and the data writing rate. The write channel buffer 6 is also so designed that the system controller 13 can read data from and write data in it.

Each of the data accumulated in the write channel buffer 11 is then read out therefrom and input to the ECC circuit 4 by way of the switch 5, in which ECC circuit 4 an error correction code is added thereto, before it is modulated by the RF and demodulation/modulation circuit 3. The signal (RF signal) output from the RF and demodulation/modulation circuit 3 is then written into the optical disk 1 by means of the optical head 2.

The address detection circuit 12 detects address information of the track of the optical disk 1 to be used for recording or reproducing data. The system controller 13 controls the operation of each of the components of the optical disk apparatus and performs various tasks including those of generating and processing a time code from the unique number assigned to each picture as will be described hereinafter, those of generating data base files having a directory structure to be used for editing operations as will be described hereinafter and those of managing the operations of recording/reproducing such files. It comprises a CPU 21 for controlling various operations, a ROM 22 that stores processing programs to be executed by the CPU 21, a RAM 23 for temporarily storing data generated in the course of processing operations and another RAM 24 for storing various information files (including data base files having a directory structure) for data recording and data reproduction that are used for the optical disk 1.

The CPU 21 finely regulates the position of the optical head 2 according to the output of the detecting operation of the address detection circuit 12. It also controls the switching operation of the switch 5.

Input section 14 comprises various switches and buttons and is adapted to be operated by the user to enter various commands. The user can use the input section 14 also for various editing operations as will be described hereinafter.

Now, the operation of reading an information file in the optical disk apparatus will be described as such a file takes an essential role in the apparatus. Assume now that the information file is titled as "VOLUME. TOC" information file, which is used for the physical addresses of the tracks on the optical disk and those of the data to be recorded/reproduced. When reading in the "VOLUME. TOC" information file, the CPU 21 of the system controller 13 employs a file system operation command stored in advance in the processing program for it to determine the physical addresses where "VOLUME. TOC" is recorded and the length thereof. Subsequently, the CPU 21 drives the optical head 2 to move it to the reading position according to the obtained address information for "VOLUME. TOC". Then, the CPU 21 selects a read out mode for the optical head 2, the RF and demodulation/modulation circuit 3 and the ECC circuit 4 and turns the switch 5 to the side of the read channel buffer 6, while finely regulating the position of the optical head 2, before it cause the optical head 2 to start reading the data. Thus, the optical head 2 reads out the data contained in "VOLUME. TOC", which are then demodulated by the RF and demodulation/modulation circuit 3 and corrected for errors by the ECC circuit 4 before accumulated in the read channel buffer 6.

The CPU 21 causes the optical head 2 to stop reading out the data when the volume of the data accumulated in the read channel buffer 6 becomes equal to or greater than that of "VOLUME. TOC". Subsequently, the CPU 21 reads out the data from the read channel buffer 6 and stores them into the RAM 24.

Now, the operation of writing data into the "VOLUME. TOC" information file, which is a file that takes an essential role in the apparatus as described above. The CPU 21 of the system controller 13 employs a file system operation command stored in advance in the processing program for it to search out an idle region having a size equal to or greater than that of "VOLUME. TOC" to be written and determines the addresses thereof.

Then, the CPU 21 transfers the data to be written that are contained in "VOLUME. TOC" and stored in RAM 24 to the write channel buffer 11. Subsequently, the CPU 21 drives the optical head 2 to move to the writing position according to the address information of the idle region. Then, the CPU 21 selects a write mode for the optical head 2, the RF and demodulation/modulation circuit 3 and the ECC circuit 4 and turns the switch 5 to the side of the write channel buffer 11, while finely regulating the position of the optical head 2, before it cause the optical head 2 to start writing the data.

Thus, the newly prepared data contained in "VOLUME. TOC" are read out from the write channel buffer 11 and then input to the ECC circuit 4 by way of the switch 5, in which ECC circuit 4 respective error correction codes are added to them before the data are modulated by the RF and demodulation/modulation circuit 3. The signals output from the RF and demodulation/modulation circuit 3 are recorded on the optical disk 1 by means of the optical head 2. The CPU 21 causes the optical head 2 to stop writing the data when the volume of the data read out from the write channel buffer 11 becomes equal to or greater than that of "VOLUME. TOC".

Finally, the CPU 21 employs a file system operation command stored in advance in the processing program to rewrite the pointer currently pointing to "VOLUME. TOC" in the file system (in the optical disk 1) to make it point to the newly written position.

Now, the operation of editing data on the optical disk 1 typically including cutting out and/or erasing data, inserting data (in the proper sense of the word) without overlaying data with foreign data and/or moving part of a picture sequence will be discussed below.

It should be stressed here that the term "time codes" that is popularly being used for editing is not appropriate for use with disk media. In the case of a refreshable disk media such as an optical disk 1 as used in the above embodiment, identification numbers of a certain type are required for the recorded pictures frames for one-to-one correspondence, although the expression of "time codes" is not appropriate for them.

Therefore, for the purpose of the invention, numbers will be used as absolute references to replace time codes. While conventional time codes are made to take the role of notifying the user of the duration of time of picture reproduction from the head, virtual time codes will be arithmetically prepared on the basis of the numbers operating as absolute references and presented to the user. In other words, time codes are used inside the editing equipment in the case of conventional tape media, whereas the numbers handled in the editing equipment are different from the sets of hour, minute, second and frame presented to the user in this embodiment.

Keeping the above in mind, now, the method of identifying picture frames in a disk media for recording images according to the invention will be described.

The method of identifying picture frames in a disk media (optical disk 1) is differentiated from the method used in conventional tape media in terms of the following two ideas.

(I) A novel user interface (UI) different from its counterpart of the tape media is used for the disk media.

(II) Time codes as used in tape media are virtually prepared for the disk media.

In order to realize a novel user interface different from its counterpart of the tape media according to the invention as pointed out above by (I), a picture sequence will be handled as a collection of files. The files of such a collection will be data base files having a directory structure. A file may be divided (DIV) and a file may be inserted into another (INS), while a new file may be added to another (ADD) and any file may be moved from a location to another (MOV).

Figure 2A:
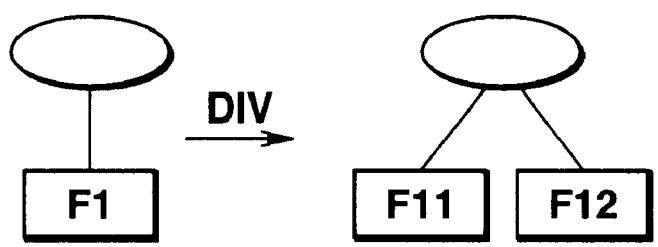
FIG. 2 schematically illustrates how a file is configured and manipulated according to the invention.
Figure 2B:
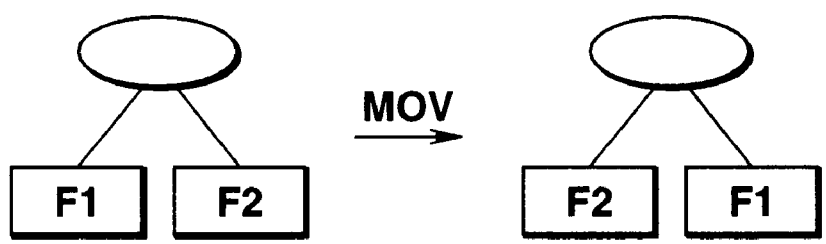
Figure 2C:
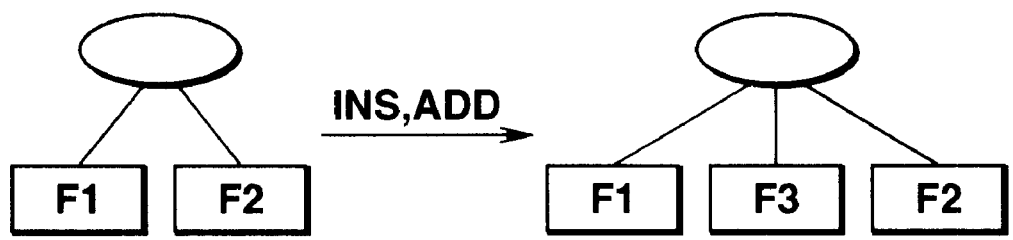

FIG. 2 schematically illustrates how a file is configured and manipulated according to the invention. In FIG. 2, reference symbol DIV represents an operation of dividing a file and INS represents that of inserting a file into another, whereas ADD and MOVE represent respectively an operation of adding a file to another and that of moving a file from a location to another. More specifically, FIG. 2A schematically shows a DIV operation, where file F1 is divided to produce file F11 and file F12. FIG. 2B schematically shows a MOV operation, where file F1 is moved so that file F1 and file F2 may appear to have been switched after the MOV. FIG. 2C schematically shows an INS or ADD operation, where file F3 is added or inserted between file F1 and file F2. In the case of a tape media, the order of reproducing picture frames is automatically defined by the sequence of picture frames from the head of the tape, whereas files may be reproduced in any order by means of the user interface of (I) (e.g., according to the recorded sequence if the user does not specify otherwise). While the duration of time of picture reproduction may be found in each file, no time code system is used for the entire disk.

In order to realize virtual time codes that the user can see as pointed out by (II) above, numbers that are not intermixed by editing operations will be used and converted into time codes. Thus, for realizing virtual time codes that the user can see, (1) numbers have to be uniquely allocated to pictures within the disk media and (2) a procedure, or a rule, has to be established for converting the allocated numbers of (1) into virtual time codes.

These two conditions are necessary and sufficient conditions for realizing virtual time codes.

Now, this will be described in greater detail. Note that, in the following description, a stream of picture to which the so-called MPEG system is applied may be used. The MPEG (Moving Picture Image Coding Experts Group) belongs to ISO/LEC JTC1/SC29 (International Organization for Standardization/International Electrotechnical Commission, Joint Technical Committee 1/Sub-Committee 29:) and has provided ISO11172 as MPEG Standards 1 and ISO13818 as MPEG Standards 2. Of these international standards, ISO11172-1 and ISO13818-1 provide standards for system multiplexing and ISO11172-2 and SIO13818-2 provide standards for video coding, while ISO11172-3 and SIO13818-3 provide standards for audio coding.

The allocation of unique numbers to pictures that is essential to the present invention will be discussed first. When allocating numbers for the purpose of the invention, care should be taken so that the editing unit and the accuracy of editing may not be restricted by the allocation. Editing should be restricted only in terms of inevitable factors found in layers located under the uppermost video application layer.

Some of the techniques that can be used for the allocation of numbers will be discussed below.

While the physical locations on the disk may reliably be used for the numbers to be allocated to pictures on a disk media, they are only specific to the particular disk media being used so that they can no longer be used when pictures are copied on some other media, e.g., a hard disk, for an editing session. Additionally, they may not be able to cope with new technological developments that may take place in the field of recording media.

Alternatively, logical sector numbers on the disk may be used as numbers to be allocated to pictures on a disk media, relying on the file system of the disk. Then again, however, they can no longer be used when pictures are copied on some other media, e.g., a hard disk, having a different file system.

Still alternatively, the date, that is the year, the month, the day, the hour, the minute and the second of the time when a particular picture is shot and recorded may be used. While this may be reliable within a disk media, some other picture copied from some other disk can carry the same number.

In view of the above circumstances, according to the invention, the order in which pictures are recorded on the disk media will be used for allocating numbers to the pictures in this embodiment. More specifically, in this embodiment, numbers are allocated to the pictures in the order in which they are recorded. The source of each picture will not be questioned. If a picture is copied from some other disk, a new number will be assigned to it. Therefore, no two or more than two pictures can bear a same number on a disk media in this embodiment. If a picture is erased, the number allocated to it for a one-to-one correspondence will be handled as missing number. Missing numbers may be avoided and reused either (X) by reallocating the numbers each time a missing number is produced or (Y) by keeping the information of each missing number and assigning the number to a newly recorded picture.

However, the technique of (X) will give rise to a very large overhead load and hence not realistic, whereas that of (Y) will require a large table for recording all the missing numbers, which will increase with each editing session that can produce sporadic missing numbers so that, if the maximum value of missing numbers is suppressed by quickly reusing them, this technique will not provide any remarkably advantage in view of the storage area that may be necessary for displaying and managing the missing numbers.

For the above reasons, no technique of reallocation of numbers will be employed in this embodiment. Then, while a large storage area may be required to store all the missing numbers, the information on the management of the missing numbers can be updated quicker than any other techniques to a great advantage of this embodiment.

Now, the numbering rule of the embodiment will be described.

An identification number is assigned to each picture recorded on a disk media and remains invariable until the picture is erased in this embodiment. Such a number will be referred to as "picture number" for the purpose of the invention. While the term "picture" may refer to a picture frame in most cases, the expression of "picture frame" is not used for the purpose of the invention although it may ordinarily be more accurate because a picture can sometimes be a picture field. The user may want to assign a unequivocal specific symbol (number) to each picture for the purpose of identification, which symbol (number) has to remain unchanged before and after any editing session so that it may conveniently be used for editing the recorded pictures. When searching for a specific scene that may appear very important to the user, the latter will use the unequivocal symbol (number) for retrieving the scene. Thus, while picture numbers are to be used within the equipment that handles the disk media and may be a recording apparatus, they can also conveniently be used by the user for such purposes as pointed out above.

The largest value of the picture numbers used in a disk media will be changed when an operation of recording images as external input is over and when one or more than one (substantive) pictures are copied in an editing session conducted on the disk media. However, it will not be changed by an editing operation such as erasing, inserting or moving a picture.

A table showing the correspondence of picture numbers and scenes (which may be referred to as cuts or tracks) is necessary for invariably holding the relation between each picture number and a corresponding substantive picture. The table will carry the first picture number, the length of consecutive picture numbers (or the ending picture number), the picture number recorded latest and the addresses of pairs of pictures to be linked. In this table, an area of consecutive picture numbers corresponds to an entry. In other words, the stretch of part or all of a cut (scene) indicated by an entry is referred to as an area. Thus, the number of entries of each cut will be (the number of discontinuities in the cut+1).

FIG. 3 schematically shows the format of an entry can be used for the purpose of the invention. Referring to FIG. 3, each entry is defined in terms of the entry address as indicated by (A), the cut number (scene number) as indicated by (B), the starting picture number as indicated by (C), the length (or the ending picture number) as indicated by (D), the pointer pointing to the preceding entry (the preceding entry address) as indicated by (E) and the pointer pointing to the succeeding entry (the succeeding entry address) as indicated by (F).

The picture number is reset to 0 only when the entire pictures recorded on the disk are erased. If all the picture numbers of the disk are used and there remains no idle picture number, all the pictures will have to be copied onto a new disk. Then, the pictures on the new disk will respectively carry consecutive picture numbers starting from 0 (and hence defragmented) so that there may be some idle numbers available for new pictures to be additionally recorded.

When a picture is copied within the disk (with the original picture remaining alive), a new picture number will be assigned to the copied picture.

Now, the number of bits required for the picture numbers on a disk media will be estimated. Assuming that images for two hours are recorded on a disk. Then, the number of fields will be $$2 \times 60 \times 60 \times 60 = 432,000$$

and, if the entire disk is reused for 100 times before its service life end, the total number of fields will be $$432,000 \times 100 = 43,200,000.$$

43,200,000 can be expressed by using 26 bits, which are equal to the number of bits necessary for expressing conventional time codes by means of BCD (binary coded decimal).

FIG. 4 schematically illustrates a time code of hour:minute:second:frame expressed in the form of BCD. It will be understood from FIG. 4 that a total of 26 bits will be necessary for expressing a time code in BCD.

The types of editing operation on a disk media include erasing a picture, dividing a cut (scene), adding a picture and moving a picture to rearrange the order of reproducing pictures. For the purpose of the invention, the allocated picture numbers will not be changed if one or more than one pictures are moved.

FIG. 5 schematically illustrates how editing operations are conducted on a disk.

In FIG. 5, (a) indicates the picture sequence before the editing operations and (b) indicates the picture sequence after the editing operations. The numbers in FIG. 5 are picture numbers. In the instance of FIG. 5, the pictures (picture frames) from picture number 11 to picture number 14 are cut out from the picture sequence of (a) and the pictures (picture frames) from picture number 21 to picture number 24 are moved from the picture sequence of (a) and inserted between picture number 30 and picture number 31 of (b) in FIG. 5. Since the pictures from picture number 11 to picture number 14 are cut out (removed) from the picture sequence of (a) in FIG. 5, those numbers will be missing in the picture sequence of (b) in FIG. 5. It will be appreciated that picture numbers from 21 to 24 in (a) are not changed after the pictures carrying the numbers are moved as shown in (b) of FIG. 5.

Figure 6:
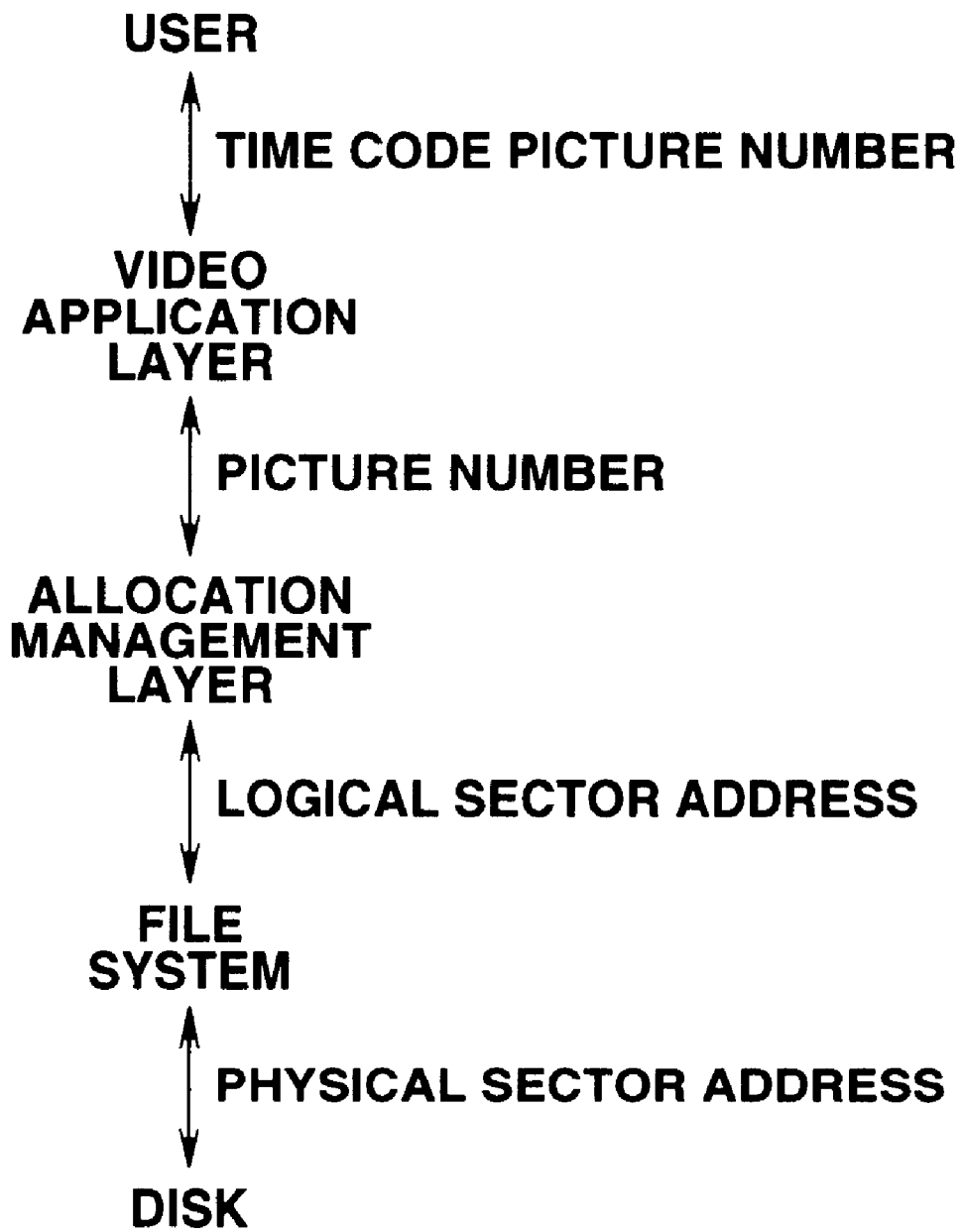
FIG. 6 schematically illustrates the relation of physical/logical sector addresses, picture frame numbers and time codes.

FIG. 6 schematically illustrates the relation of physical/logical sector addresses, picture frame numbers and time codes. Referring to FIG. 6, it will be appreciated that time codes and picture numbers are used for the interaction between the user and the video application layer and picture numbers are used for the interaction between the video application layer and the allocation management layer, whereas logical sector addresses are used for the interaction between the allocation management layer and the file system and physical sector addresses are used for the interaction between the file system and the disk.

The format of the table for summarily showing the entries of the embodiment will be discussed below. The picture numbers will not be reused in this embodiment.

The table contains a number of elements, to each of which a unique and unequivocal picture number is assigned. When actually using the embodiment, however, it may not be necessary to provide each and every one of the pictures on the disk with an element (entry) on the table. How to define the largest unit of entry may have the following choices.

(A) An entry may be defined as a collection of pictures having consecutive numbers in a scene. Then, the table may be of a necessary minimal size.

(B) An entry may be defined as a GOP (group of pictures). Then, if an editing operation is conducted for a number of pictures smaller than that of a GOP, a collection of pictures smaller than a COP will become an entry, although this definition will make it easy to pinpoint a target picture during the operation of fast forwarding (FF) or fast rewinding (FR).

(C) An entry may be defined as an I-picture or a P-picture. Then, a searching operation will become very smooth and easy.

A table of a necessary minimal size will be discussed below. Assume here a picture number is assigned to a field of video signals.

Then, if a group of pictures (fields) having consecutive picture numbers is handled as an entry, it will by turn define the necessary minimal size for the table. If a single scene is recorded continuously, an entry will be added on the table for the single scene. Then, the number of entries of the table will increase each time a new scene is added to produce one or more than one discontinuities in the picture numbers in an editing operation. Thus, the number of entries will be equal to (the number of discontinuities+1).

The size of an entry may be expressed in a manner as described below.

The starting number (starting picture number) SFN of a series of consecutive picture numbers is expressed by 26 bits and the length LEN of the consecutive picture numbers (or the ending number (ending picture number) of the consecutive picture numbers) is expressed by 26 bits, whereas the picture number recorded latest on the disk media (hereinafter referred to as latest recorded picture number EFN of the disk) is also expressed by 26 bits.

The number of entries can be estimated in a manner as described below.

If there is no editing operation or pictures are erased or moved by an entire scene, the principle of one entry for one scene will be maintained. However, the number of entries will be incremented by one each time a scene is divided.

Figure 7:
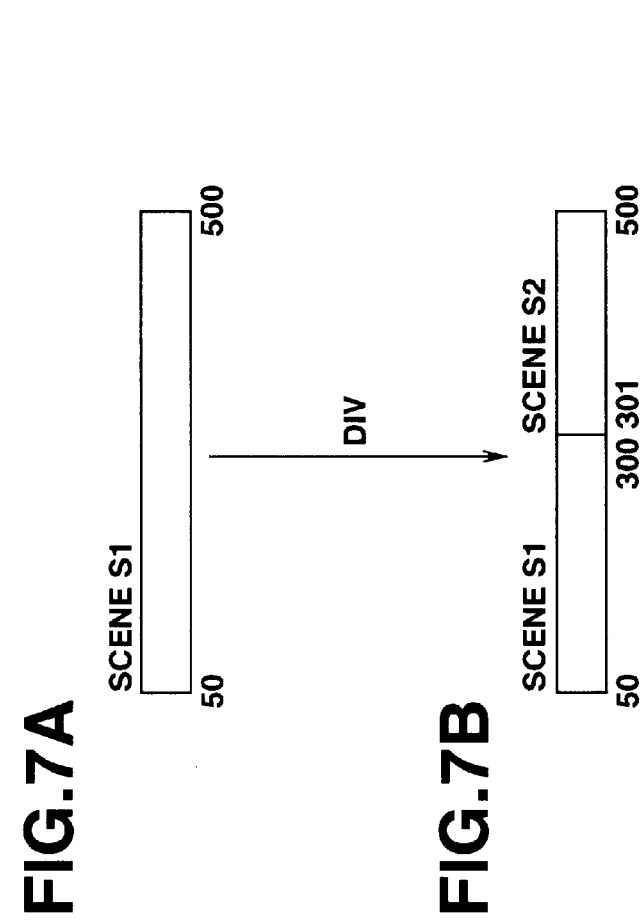
FIG. 7 is a schematic illustration of an operation of dividing a picture sequence on a scene basis and the smallest table required for it.

The necessary minimal size of a table that will be required for dividing a scene will be discussed by referring to FIG. 7. FIG. 7 schematically illustrates an operation of dividing a scene (DIV).

When scene S1 comprising pictures with picture number 50 through picture number 500 and hence without any discontinuity as indicated by (a) in FIG. 7 is divided into scene S1 with picture number 50 through picture number 300 showing no discontinuity and scene S2 with picture number 301 through picture number 500 also showing no discontinuity as indicated by (b) in FIG. 7, the necessary minimal size of the table will also be changed (modified or updated) from that of (c) in FIG. 7 to that of (d) in FIG. 7.

More specifically, as shown in (c) of FIG. 7, the table with the necessary minimal size corresponding to scene S1 of (a) in FIG. 7 contains the following values; 500 for the latest recorded picture number EFN of the disk, 2 for the entry address of scene S1, 1 for the scene number SN of scene S1, 50 for the starting picture number SFN of scene S1, 451 for the length LEN of scene S1 (or 500 for the ending picture number of scene S1), 2 for the pointer pointing to the preceding entry (preceding entry address) and 2 for the pointer pointing to the succeeding entry (succeeding entry address).

On the other hand, a single number of 500 is listed as the latest recorded picture number EFN of the disk for the entries of table of (d) in FIG. 7 for scene Si and scene S2 produced by dividing the original scene S1 as shown in (b) of FIG. 7 and then the entry for scene S1 contains the following values; 2 for the entry address of scene S1, 1 for the scene number SN of scene S1, 50 for the starting picture number SFN of scene S1, 251 for the length LEN of scene S1 (or 300 for the ending picture number of scene S1), 2 for the preceding entry address and 2 for the succeeding entry address, whereas the entry for scene S2 contains the following values; 3 for the entry address of scene S2, 2 for the scene number SN of scene S2, 301 for the starting picture number SFN of scene S2, 200 for the length LEN of scene S2 (or 500 for the ending picture number of scene S2), 3 for the preceding entry address and 3 for the succeeding entry address.

Figure 8:
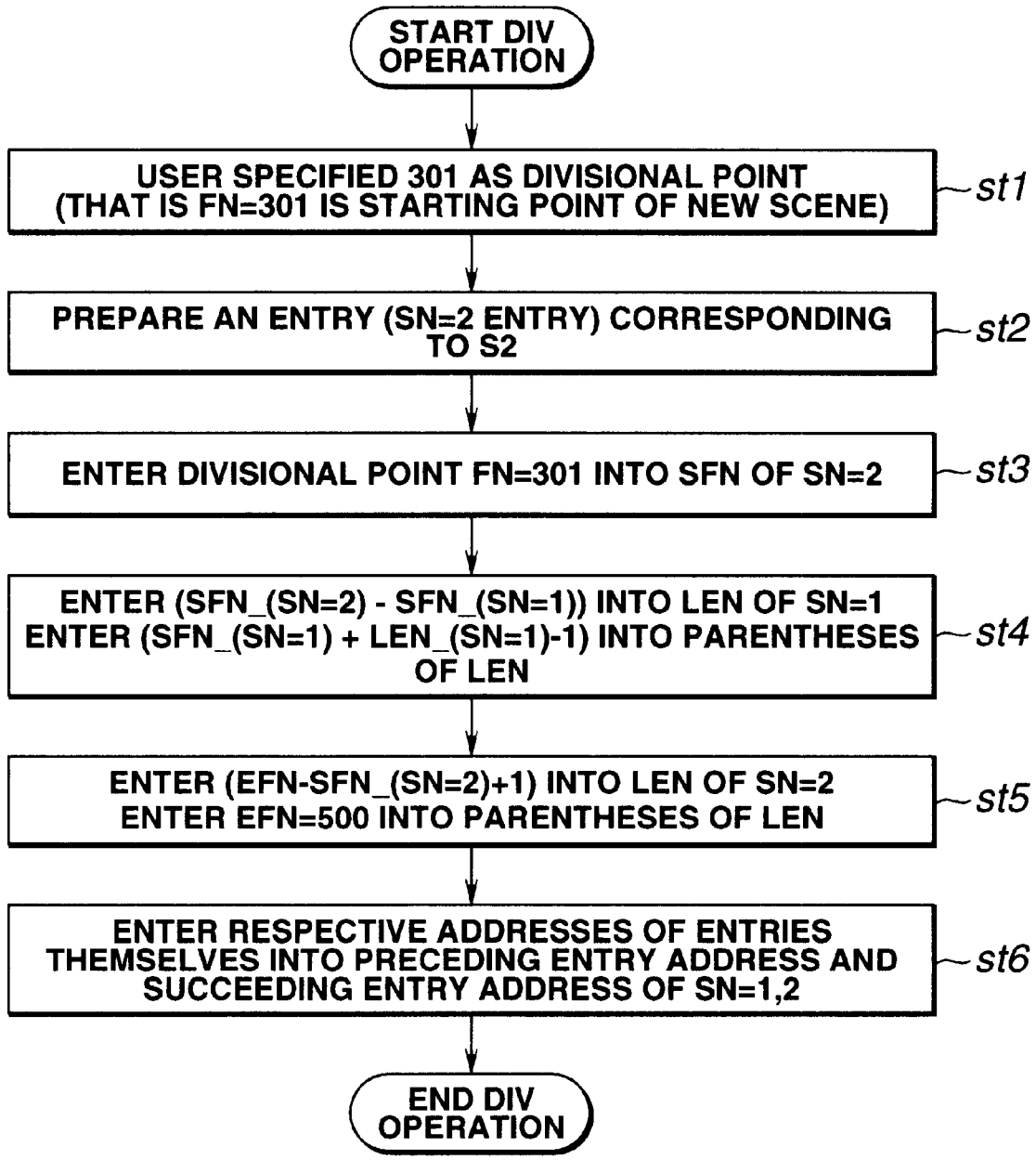
FIG. 8 is a flow chart illustrating the operation of dividing a picture sequence on a scene basis.

For executing an operation of dividing a scene (DIV) as illustrated in FIG. 7 on an optical disk apparatus as shown in FIG. 1, the system controller 13 updates the data base file for editing operations in a manner as indicated by the flow chart of FIG. 8. Note that symbol FN denotes a picture number in the following description.

Firstly, assume that a picture having a picture number FN of 301 is specified as point for dividing a scene and hence as starting point of a new scene of scene S2 at step st1 of the flow chart of FIG. 8 according to the user input at the input section 14.

As the starting point is specified for a new scene of scene S2 by the operation of the user for dividing a scene, the system controller 13 prepares an entry corresponding to the new scene S2 (with a scene number SN equal to 2) at step st2 and then, at step st3, it writes down the value of 301 for the picture number FN of the dividing point as the starting picture number SFN of the entry of the scene S2 (SFN=301).

Then, at step st4, the system controller 13 enters the value obtained by subtracting the value of the starting picture number SFN of scene S1 (SFN_(SN=1)), or SFN=50 as shown in FIG. 7, from the value of the starting picture number SFN of scene S2 (SFN_(SN=2)), or SFN=301 as shown in FIG. 7, which is equal to 251 (SFN_(SN=2)–SFN_(SN=1)), for the length LEN of scene S1 into the entry with the scene number SN of 1. At the same time, the system controller 13 enters the value obtained by adding the value of the starting picture number SFN of scene S1 (SFN_(SN=1)) and the value obtained by subtracting 1 from the length LEN of scene S1 (LEN_(SN=1)–1), or the length LEN=251 of scene S1 minus 1 plus the starting picture number SFN=50 of scene S1, which is equal to 300, into the parentheses after the length LEN of the entry with the scene number SN of 1.

Then, at step st5, the system controller 13 enters the value obtained by subtracting the value of the starting picture number SFN of scene S2 (SFN_(SN=2)) plus 1 (SFN_(SN=2)+1), or SFN=301–1, from the value of the latest recorded picture number EFN of the disk, of EFN=500, which is equal to 200, (EFN–SFN_(SN=2)+1), for the length of scene S2 into the entry with the scene number SN of 2. At the same time, the system controller 13 enters the value of the latest recorded picture number EFN, or EFN=500, into the parentheses after the length LEN of the entry with the scene number SN of 2.

Subsequently, at step st6, the system controller 13 enters the addresses of the respective entries with the scene numbers of SN1 and SN2 for the preceding addresses and the succeeding addresses of the respective entries with the scene numbers of SN1 and SN2.

Thus, the system controller 13 modifies the entries in a manner described above in response to the operation of the user for dividing the scene and then reads out the contents of the table containing the modified entries from the RAM 24 and cause them to be recorded on a predetermined region of the optical disk 1 (e.g., ""VOLUME. TOC"" or some other desired region). Therefore, for any subsequent data reproducing operation, the above table will be reproduced and the system controller 13 can control the pictures according to the contents of the table and reproduce the edited signals obtained by the above scene dividing operation.

The necessary minimal size of a table that will be required for erasing a scene will now be discussed by referring to FIG. 9. FIG. 9 schematically illustrates an operation of erasing a scene (ERA).

When area E2 of pictures with picture number 100 through picture number 199 is erased from scene S1 comprising pictures with picture number 50 through picture number 400 and hence without any discontinuity as indicated by (a) in FIG. 9 and area E1 with picture number 50 through picture number 99 and area E3 with picture number 200 through picture number 400 are connected to produce new scene S1 as indicated by (b) in FIG. 9, the necessary minimal size of the table (and the entries) will also be changed from that of (c) in FIG. 9 to that of (d) in FIG. 9.

More specifically, as shown in (c) of FIG. 9, the table with the necessary minimal size corresponding to scene S1 of (a) in FIG. 9 contains the following values; 400 for the latest recorded picture number EFN of the disk, then for area E1 of scene S1; 2 for the entry address of area E1, 1 for the scene number SN of scene S1 where area E1 is found, 50 for the starting picture number SFN of area E1, 50 for the length LEN of area E1 (or 99 for the ending picture number of area E1), 2 for the preceding entry address and 3 for the succeeding entry address, for area E2 of scene S1; 3 for the entry address of area E1, 1 for the scene number SN of scene S1 where area E2 is found, 100 for the starting picture number SFN of area E2, 100 for the length LEN of area E2 (or 199 for the ending picture number of area E2), 2 for the preceding entry address and 4 for the succeeding entry address, and for area E3 of scene S1; 4 for the entry address of area E1, 1 for the scene number SN of scene S1 where area E3 is found, 200 for the starting picture number SFN of area E3, 201 for the length LEN of area E3 (or 400 for the ending picture number of area E3), 3 for the preceding entry address and 4 for the succeeding entry address.

On the other hand, a single number of 400 is listed as the latest recorded picture number EFN of the disk for the entries of table of (d) in FIG. 9 for scene S1 and scene S2 produced by restructuring the original scene S1 as shown in (b) of FIG. 9 and then the entry for area E1 of scene S1 contains the following values; 2 for the entry address of area E1 of scene S1, 1 for the scene number SN of scene S1 where area E1 is found, 50 for the starting picture number SFN of area E1, 50 for the length LEN of area E1 (or 99 for the ending picture number of area E1), 2 for the preceding entry address and 4 for the succeeding entry address, whereas the entry for area E3 of scene S1 contains the following values; 4 for the entry address of area E3 of scene S1, 1 for the scene number SN of scene S1 where E3 is found, 200 for the starting picture number SFN of area E3, 201 for the length LEN of area E3 (or 400 for the ending picture number of area E3), 2 for the preceding entry address and 4 for the succeeding entry address.

Figure 10:
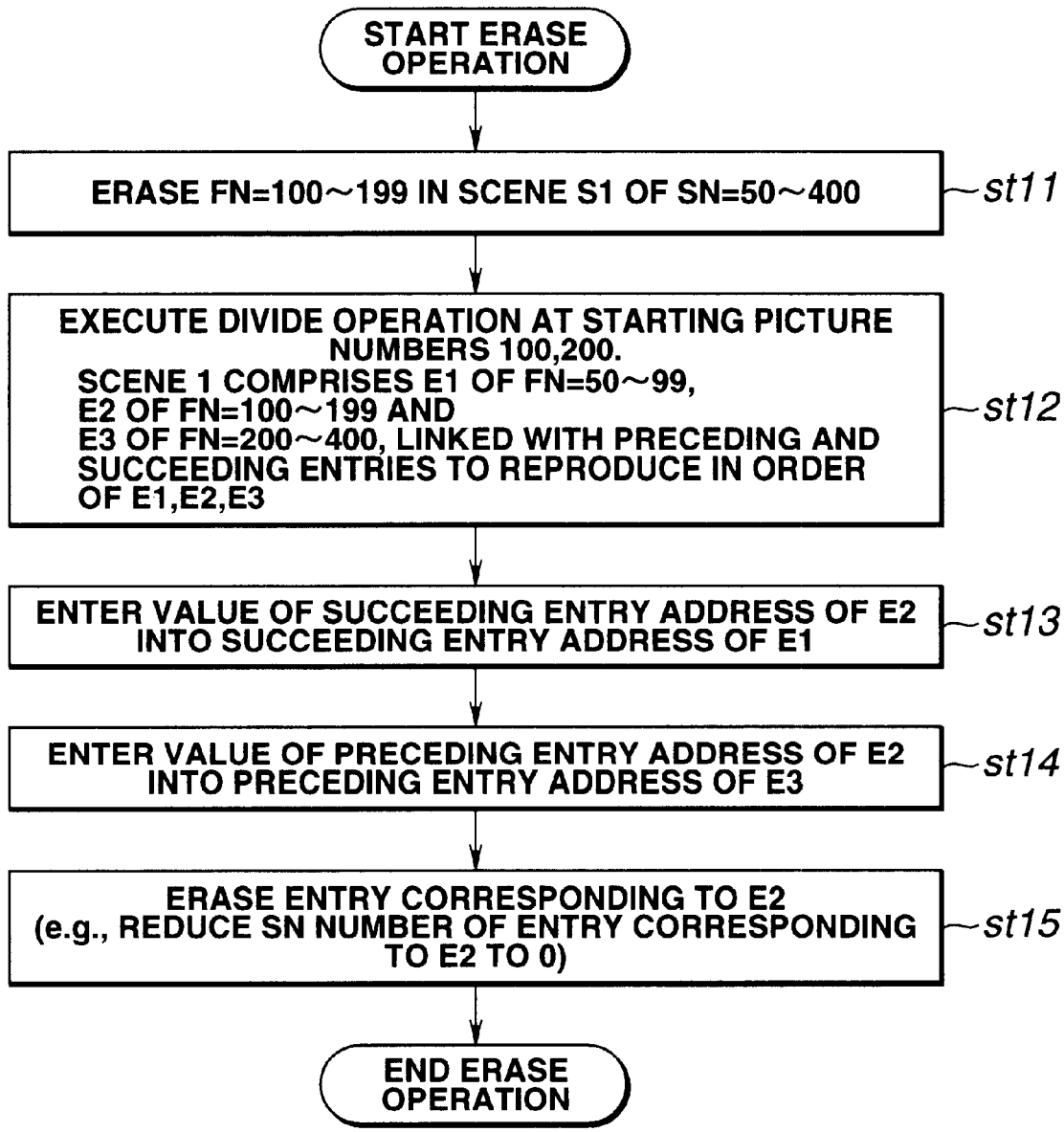
FIG. 10 is a flow chart illustrating the operation of erasing a scene of a picture sequence.

For executing an operation of erasing a scene (ERA) as illustrated in FIG. 9 on an optical disk apparatus as shown in FIG. 1, the system controller 13 updates the data base file for editing operations in a manner as indicated by the flow chart of FIG. 10.

Firstly, assume that a sequence of pictures from picture number FN=100 to picture number FN=199 is specified as area to be erased from scene S1 starting with picture number FN of 50 and ending with picture number FN of 400 at step st11 of the flow chart of FIG. 10 according to the user input at the input section 14. Then, entries that can accommodate the specified area to be erased without problem will have to be prepared because a single entry may currently be covering the entire scene S1. Thus, at step st12, the system controller 13 divides the entry at picture number FN=100 and at picture number FN=200 for area E2 to be erased. More specifically, the system controller 13 produces area E1 with picture numbers FN=50 through 99, area E2 with picture numbers FN=100 through 199 and area E3 with picture numbers FN=200 through 400 out of the original scene S1 and link the preceding and succeeding entries so as to make areas E1, E2 and E3 to be reproduced in the described order.

Then, at step st13, the system controller 13 writes down the value of the succeeding entry address of area E2 for the succeeding entry address of E1 and, at step st14, writes down the value of the preceding entry address of area E2 for the preceding entry address of area E3.

Subsequently, the system controller 13 erase the entry corresponding to area E2. The entry corresponding to area E may, for example, be erased by reducing the scene number SN of the entry corresponding to area E2 to 0 in a manner as described below.

Namely, the system controller 13 modifies the entries as described above in response to the operation of the user for erasing the scene and then reads out the contents of the table containing the modified entries from the RAM 24 and cause them to be recorded on a predetermined region of the optical disk 1 (e.g., ""VOLUME. TOC"" or some other desired region). Therefore, for any subsequent data reproducing operation, the above table will be reproduced and the system controller 13 can control the pictures according to the contents of the table and reproduce the edited signals obtained by the above scene erasing operation.

Figures 11A, 11B, 11C, 11D:
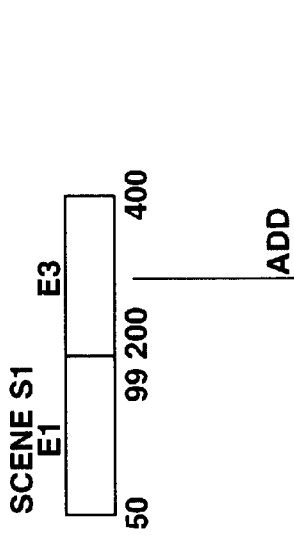
FIG. 11 is a schematic illustration of an operation of adding a scene to a picture sequence and the smallest table required for it.

The necessary minimal size of a table that will be required for adding a scene will now be discussed by referring to FIG. 11. FIG. 11 schematically illustrates an operation of adding a scene (ADD). More specifically, it shows how a different scene, or scene S2, is added to the end of scene S1 ((b) of FIG. 9) modified by erasing an area out of the original scene as described above by referring to FIG. 9.

When scene S2 of pictures with picture number 401 through picture number 599 as shown in (b) of FIG. 11 is added to scene S1 comprising area E1 and area E3 as shown in (a) of FIG. 11, the necessary minimal size of the table will also be changed (modified or updated) from that of (c) in FIG. 11 to that of (d) in FIG. 11.

More specifically, as shown in (c) of FIG. 11, the table with the necessary minimal size corresponding to scene S1 of (a) in FIG. 11 contains the following values, which are mostly same as those listed for area E1 and area E3 in (d) of FIG. 9 above; 400 for the latest recorded picture number EFN of the disk, then for area E1 of scene S1; 2 for the entry address of area E1 of scene S1, 1 for the scene number SN of scene S1 where area E1 is found, 50 for the starting picture number SFN of area E1, 50 for the length LEN of area E1 (or 99 for the ending picture number of area E1), 2 for the preceding entry address and 10 for the succeeding entry address and for area E3 of scene S1; 10 for the entry address of area E3 of scene S1, 1 for the scene number SN of scene S1 where E3 is found, 200 for the starting picture number SFN of area E3, 201 for the length LEN of area E3 (or 400 for the ending picture number of area E3), 2 for the preceding entry address and 10 for the succeeding entry address.

On the other hand, a single number of 599 is listed as the latest recorded picture number EFN of the disk for the entries of table of (d) in FIG. 11 for scene S1 and scene S2 produced by adding scene S2 as shown in (b) of FIG. 11 and then the entry for area E1 of scene S1 contains the following values; 2 for the entry address of area E1 of scene S1, 1 for the scene number SN of scene S1 where area E1 is found, 50 for the starting picture number SFN of area E1, 50 for the length LEN of area E1 (or 99 for the ending picture number of area E1), 2 for the preceding entry address and 10 for the succeeding entry address, whereas the entry for area E3 of scene S1 contains the following values; 10 for the entry address of area E1 of scene S1, 1 for the scene number SN of scene S1 where area E3 is found, 200 for the starting picture number SFN of area E3, 201 for the length LEN of area E3 (or 400 for the ending picture number of area E3), 2 for the preceding entry address and 10 for the succeeding entry address, and the entry for scene S2 contains the following values; 11 for the entry address of scene S2, 2 for the scene number SN of scene S2, 401 for the starting picture number SFN of scene S2, 199 for the length LEN of scene S2 (or 599 for the ending picture number of scene S2), 11 for the preceding entry address and 11 for the succeeding entry address.

Figure 12:
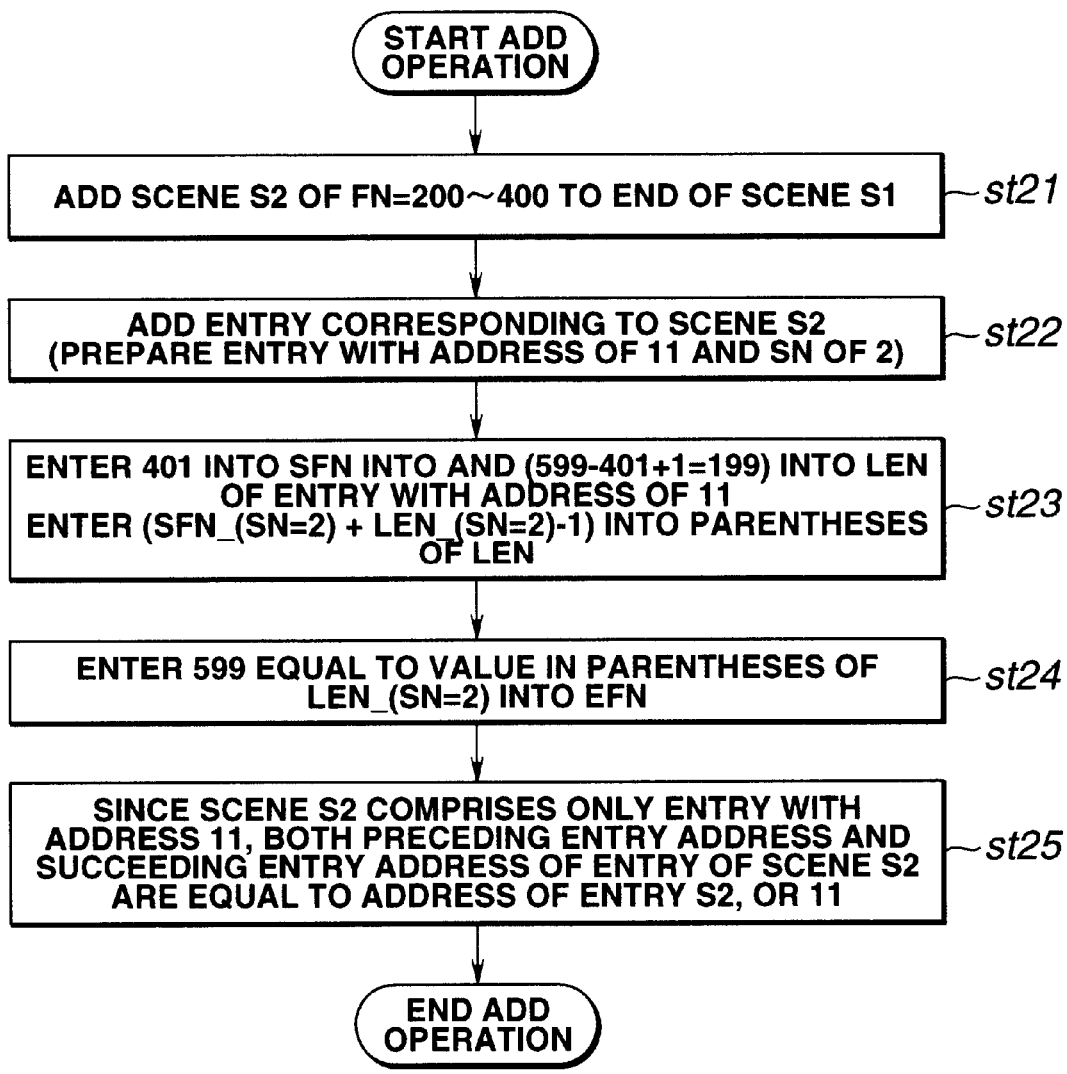
FIG. 12 is a flow chart illustrating the operation of adding a scene to a picture sequence.

For executing an operation of adding a scene (ADD) as illustrated in FIG. 11 on an optical disk apparatus as shown in FIG. 1, the system controller 13 updates the data base file for editing operations in a manner as indicated by the flow chart of FIG. 12.

Firstly, assume that scene S2 including pictures from picture number FN=200 to picture number FN=400 is specified to be added to the end of scene S1 (at the end of area E of scene S1) at step st21 of the flow chart of FIG. 12 according to the user input at the input section 14.

As a new scene S2 is specified by the user input for adding a scene, the system controller 13 add a new entry for scene S2 at step st22. More specifically, the system controller 13 prepares an entry having an address value of 11 and a scene number SN of 2 as shown in (d) of FIG. 11 for scene S2.

Then, at step st23, the system controller 13 writes down a value of 401 as starting picture number SFN for the entry (of scene S2) with the address value of 11 and a value of (599−401+1)=199 as length LEN of scene S2. At the same time, the system controller 13 writes down into the parentheses of the length LEN for the entry of scene S2 in FIG. 11 the value obtained by adding the value of the starting picture number SFN of scene S2 (SFN_(SN=2)) to the value of the length LEN of the scene S2 (LEN_(SN=2)) less 1 (LEN_(SN=2)−1), or (SFN_(SN=2)+LEN_(SN=2)−1). More specifically, the value of 599 obtained by adding the value of the starting picture number SFN=401 of scene S2 to the length LEN=199 of scene S2 less 1, or 198, into the parentheses of the length LEN for the entry of scene S2.

Then, at step st24, the system controller 13 enters the value equal to the on in the parentheses of the length for the entry of scene S2 as the latest recorded picture number EFN of the disk.

Subsequently, at step st25, the system controller 13 makes both the preceding entry address of the entry of scene S2 and the succeeding entry address of the entry of scene S2 equal to the value of 11 of the address of the entry of scene S2 in view of the fact that scene S2 is covered by a single entry having the address of 11.

Namely, the system controller 13 modifies the entries as described above in response to the operation of the user for adding the scene and then reads out the contents of the table containing the modified entries from the RAM 24 and cause them to be recorded on a predetermined region of the optical disk 1 (e.g., ""VOLUME. TOC"" or some other desired region). Therefore, for any subsequent data reproducing operation, the above table will be reproduced and the system controller 13 can control the pictures according to the contents of the table and reproduce the edited signals obtained by the above scene adding operation.

Now, a technique for adding entries for fast forwarding (FF) and fast rewinding (FR) will be discussed below.

At the time of recording pictures, an entry will be prepared for each GOP and added to the table (an entry for the leading I-picture of each GOP). Then, the largest single area indicated by an entry will become an GOP. Of course, there can be an entry for indicating any size smaller than that of an GOP. With this technique of preparing an entry for each GOP, the leading I-picture of a GOP can be accessed conveniently in a fast forwarding (FF) or fast rewinding (FR) operation.

It will be appreciated that the number of entries will increase when editing operations such as erasing and/or adding are conducted on the basis of an area smaller than a GOP.

Assume that an entry is prepared for each GOP and a GOP has a length of 0.5 seconds and a recording operation lasts for 2 hours. Then, the number of entries will be estimated to be as $$2 \times 60 \times 60 \times 2 = 14,400.$$

FIG. 13 schematically illustrates an operation of preparing an entry for each GOP. In the example of FIG. 13, scene S1 of (b) in FIG. 13 will be obtained by carrying out an editing session on the basis of the table shown in (e) of FIG. 13 for scene S1 as shown in (a) of FIG. 13.

Referring to FIG. 13, scene S1 shown in (a) of FIG. 13 contains pictures with consecutive picture numbers starting from picture number 600 and ending at picture number 899, while a GOP in scene S1 may contain pictures with consecutive picture numbers from 750 to 779 as shown in (f) of FIG. 13. Additionally, scene S1 of (a) in FIG. 13 comprises 10 areas, area E0 through area E9, each having a length LEN equal to 30 fields and entries are prepared for the respective areas E0 through E9, so that a table with a necessary minimal size is formed by these entries.

More specifically, the table with a necessary minimal size that corresponds to scene S1 of (a) in FIG. 13 contains a value of 899 for the latest recorded picture number EFN of the disk, which is followed by address values of 10 through 19 for the respective entries for areas E0 through E9 of scene S1, 1 for the scene number SN of scene S1 where areas E0 through E9 are found, values of 600, 630, 660, . . . , 870 for the starting picture numbers SFNs of the respective areas E0 through E9, 30 for the length of each of areas E0 through E9 (or the ending picture numbers 629, 659, 689, . . . , 899 of the respective areas E0 through E9), values of 10, 10, 11, . . . , 18 for the respective preceding entry addresses and values of 11, 12, 13, . . . , 19 for the respective succeeding entry addresses.

Then, after conducting an editing session on scene S1 as shown in (a) of FIG. 13 on the basis of the table of (e) in FIG. 13, scene S1 is obtained by combining (COM) a first area containing pictures with picture numbers 600 through 765, a second area containing pictures with picture numbers 900 through 920 and a third area containing pictures with picture numbers 780 through 899 as shown in (b) of FIG. 13. In FIG. 13, (e) shows a table that can be used for such an editing session.

The table of (e) in FIG. 13 indicates the sequence of editing operations, where symbol DIV denotes a scene dividing operation and symbol ERA denotes a scene erasing operation, while symbol ADD denotes a scene adding operation and symbol MOV denotes a scene moving operation.

Referring now to the table of(e) in FIG. 13, in the first editing operation, a GOP containing pictures with picture numbers 750 through 779 is divided (DIV) into an area containing pictures with picture numbers 750 through 765 and another area containing pictures with picture numbers 766 through 779.

Then, in the second editing operation, the area with picture numbers 766 through 779 obtained by the first editing operation, which is a scene dividing operation, will be erased (ERA).

Subsequently, in the third editing operation, an area containing pictures with picture numbers 900 through 929 will be added (ADD) to the area containing pictures with picture numbers 780 through 899 that is left unerased after the second editing operation, which is a scene erasing operation.

Thereafter, in the fourth editing operation, the area of pictures with picture numbers 900 through 929 added to the tail end of the area of pictures with picture numbers 780 through 899 will be divided (DIV) into an area of pictures with picture numbers 900 through 920 and another area of pictures with picture numbers 921 through 929.

In the fifth editing operation, the area with picture numbers 921 through 929 obtained by the fourth editing operation, which is a scene dividing operation, will be erased (ERA).

Then, in the sixth editing operation, the area with picture numbers 900 through 929 that is left unerased after the fifth editing operation, which is a scene erasing operation, is moved (MOV) between the area with picture numbers 750 through 765 and the area with picture numbers 780 through 899.

Finally, in the seventh editing operation, the area of pictures with the first picture number 600 of scene S1 through the picture number of 765 left unerased after the second editing operation, the area of pictures with picture numbers 900 through 920 that precedes the area erased by the fifth editing operation and the area of pictures with the picture number of 780 succeeding the area erased in the second editing operation through the last picture number 899 of scene S1 in (a) of FIG. 13 are combined (COM) to produce new scene S1.

Then, a table containing entries that correspond respectively to areas E10 through E22 as shown in (d) of FIG. 13 is prepared as table with the necessary minimal size for the combined scene S1 shown in (b) of FIG. 13.

More specifically, the table with necessary minimal size that is shown in (d) of FIG. 13 and corresponds to the combined scene S1 of (b) in FIG. 13 contains a value of 929 for the latest recorded picture number EFN of the disk, which is followed by address values of 10 through 22 for the respective entries for areas E10 through E22 of the combined scene S1, 1 for the scene number SN of scene S1 where areas E10 through E22 are found, values of 600, 630, 660, . . . , 750, 780, 810, 840, 870, 766, 900, 921 for the starting picture numbers SFNs of the respective areas E10 through E22, values of 30, 30, 30, . . . , 16, 30, 30, 30, 30, 14, 21, 9 for the length of each of areas E10 through E11 (or the ending picture numbers 629, 659, 689, . . . , 765, 809, 839, 869, 899, 779, 920, 929 of the respective areas E10 through E22), values of 10, 10, 11, . . . , 14, 21, 16, 18, 15 for the respective preceding entry addresses and values of 11, 12, 13, . . . , 21, 17, 18, 19, 19, 16 for the respective succeeding entry addresses.

Figure 14:
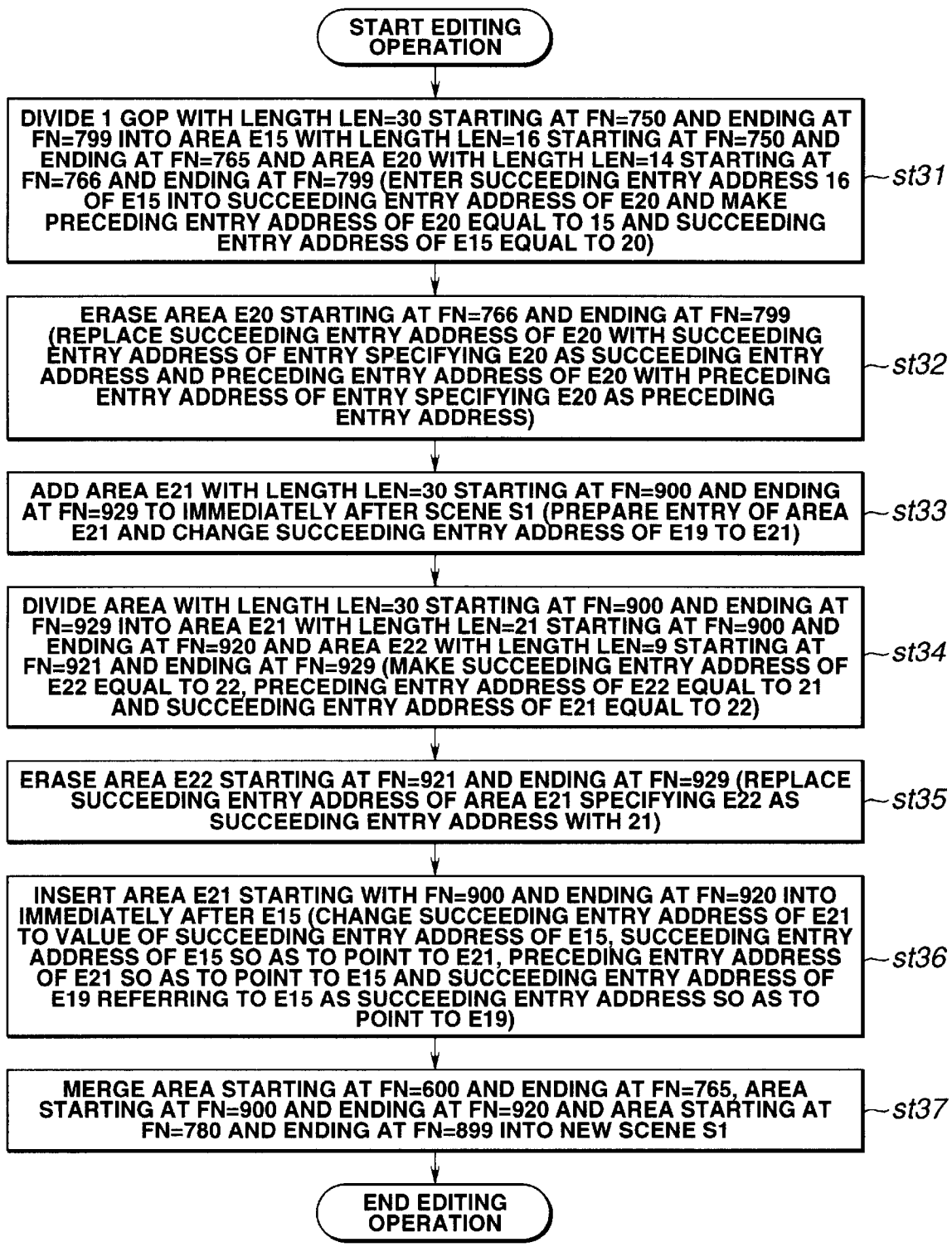
FIG. 14 is a flow chart illustrating the operation of preparing an entry for each GOP.
Figure 21A:
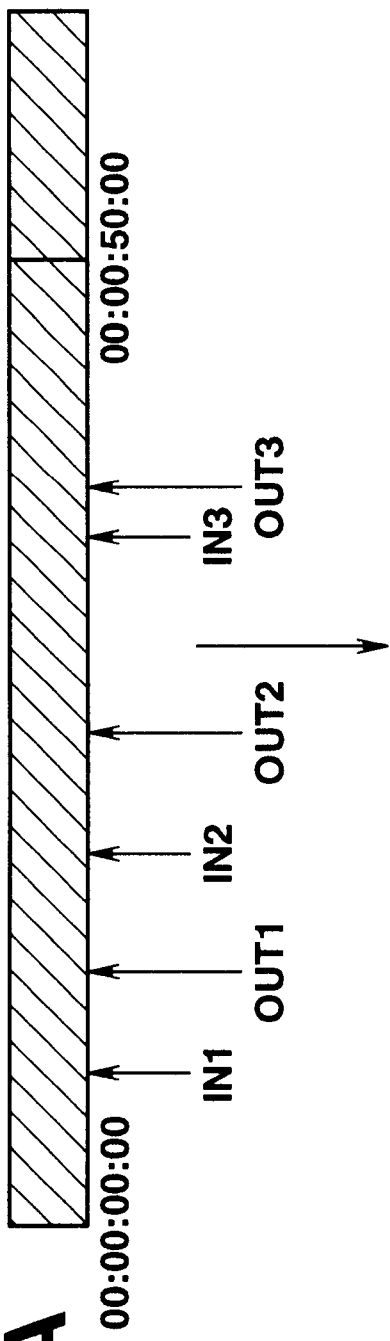
FIG. 21 is a schematic illustration showing how in-points and out-points are specified on a tape-shaped recording medium.
Figure 21B:
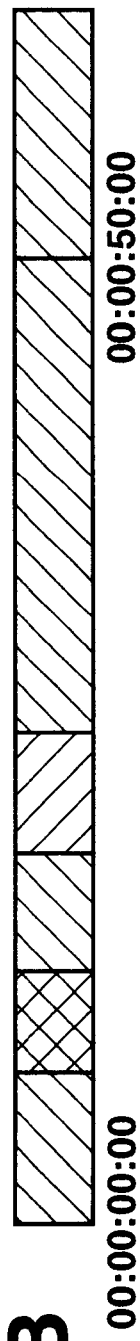

For executing an editing operation as illustrated in FIG. 13 on an optical disk apparatus as shown in FIG. 1, the system controller 13 updates the data base file for editing operations in a manner as indicated by the flow chart of FIG. 14.

Firstly, in step st31 of FIG. 14, the system controller 13 divides the single GOP containing pictures with picture numbers FN 750 through 779 and having a length LEN of 30 into area E15 containing pictures with picture numbers FN 750 through 765 and having a length LEN of 16 and area E20 containing pictures with picture numbers FN 766 through 779 and having a length LEN of 14 according to the editing table as shown in (e) of FIG. 13. Then, the system controller 13 writes down the value of 16 of the succeeding entry address of the entry for area E15 as the succeeding entry address of the entry for area E20, the value of 15 as the preceding entry address in the entry for area E20 and the value of 20 as the succeeding entry address of the entry for area E15.

Then, in step st32, the system controller 13 erases area E20 of pictures with picture numbers FN 766 through 779 and hence the entry for area E20. At this time, the system controller 13 replaces the succeeding entry address of the entry that specifies the entry of area E20 as the succeeding entry address with the succeeding entry address of the entry of area E20 and also the preceding entry address of the entry that specifies the entry of area E20 as the preceding entry address with the preceding entry address of the entry of area E20.

Subsequently, in step st33, the system controller 13 adds area E21 containing pictures with picture numbers FN 900 through 929 and having a length of 30 directly to the tail end of scene S1 according to the editing table as shown in (e) of FIG. 13. At this time, the system controller 13 prepares the entry of area E21 and modifies the succeeding entry address of the entry of area E19 to 21.

Then, in step st34, the system controller 13 divides the area containing pictures with picture numbers FN 900 through 929 and having a length LEN of 30 into area E21 containing pictures with picture numbers FN 900 through 920 and having a length LEN of 21 and area E22 containing pictures with picture numbers FN 921 through 929 and having a length LEN of 9 according to the editing table as shown in (e) of FIG. 13. Then, the system controller 13 writes down the value of 22 for the succeeding entry address of the entry for area E22, the value of 21 for the preceding entry address of the entry for area E22 and the value of 22 for the succeeding entry address of the entry for area E21.

Then, in step st35, the system controller 13 erases area E22 of pictures with picture numbers FN 921 through 929 and hence the entry for area E22 according to the editing table as shown in (e) of FIG. 13. At this time, the system controller 13 replaces the succeeding entry address of the entry that specifies the entry of area E22 as the succeeding entry address with the succeeding entry address of the entry of area E21.

Thereafter, in step st36, the system controller 13 inserts area E21 of pictures with picture numbers FN 900 through 920 to the tail end of area E15 according to the editing table as shown in (e) of FIG. 13. At this time, the system controller 13 modifies the succeeding entry address of the entry of area E22 to the succeeding entry address of the entry of area E15, the succeeding entry address of the entry of E15 to point to the entry of area E21 and the preceding entry address of area E21 to point to the entry of area E15. Additionally, the system controller 13 modifies the succeeding entry address of the entry of area E19 referring to the entry of area E15 for the succeeding entry address to point to the entry of area E19.

Then, in step st37, the system controller 13 combines the area of pictures with the first picture numbers FN 600 through 765, the area of pictures with picture numbers FN 900 through 920 and the area of pictures with the picture number FN 780 through 899 according to the table shown in (e) of FIG. 13 to produce new scene S1.

Namely, the system controller 13 modifies the entries as described above in response to the editing operation on the part of the user and then reads out the contents of the table containing the modified entries from the RAM 24 and cause them to be recorded on a predetermined region of the optical disk 1 (e.g., ""VOLUME. TOC"" or some other desired region). Therefore, for any subsequent data reproducing operation, the above table will be reproduced and the system controller 13 can control the pictures according to the contents of the table and reproduce the edited signals obtained by the above editing operation.

While it may be conceivable that an entry is preferably assigned to each and every I-picture and P-picture for smooth searching operations, more research efforts will be required to find out a mode of operation that is most suited for searching operations.

Now, the rule of generating time codes will be discussed below.

As described above, the picture numbers uniquely allocated to pictures on a disk media for the purpose of identification will end up as randomly arranged numbers after editing sessions. While this may not arise any problem for editing operations, such randomly arranged numbers are not convenient for the user who may want to identify particular pictures by means of ID codes of a sort or another.

Then, there arises a need for the system to convert the picture numbers into time codes of the type that haven been used on the conventional tape media. The time codes should be visible to the user so that the latter may easily find out the duration of time of picture reproduction and the remaining time that can be used for reproducing picture frames. It is also be necessary for the user to somehow see picture numbers for editing operations.

According to the invention, time codes are allocated according to the sequence of reproduction within a scene and through time codes will be allocated to a plurality of scenes also according to the sequence of reproduction of the scenes.

There should be an established rule for the allocation of through time codes when there are a plurality of scenes that can be reproduced. Assume, for example, there are available a basic reproduction mode adapted to reproduce all the scenes with a given sequence when no particular sequence is specified and a programmed reproduction mode adapted for the user to specify a particular sequence of reproduction. Then, the through time codes used for the basic reproduction mode may have to be processed in some way or other for the programmed reproduction mode.

A feasible processing technique may be that only the scenes selected by the user will be reproduced in the programmed reproduction mode and incremental through time code system will be utilized to allocate unique time codes respectively to all the frames of different scenes arranged in ascending order.

FIG. 15 schematically illustrate how time codes can be allocated in such a basic reproduction mode. In this example, each through time code is obtained by incrementing by one the time code of the immediately preceding frame of scenes that are arranged in ascending order of the scene numbers in view of that the through time codes maybe used for a programmed reproduction mode. Referring to FIG. 15, there are shown a total of four scenes, scene S1 through scene S4, of which scene S1 carries time codes 00:00 through 10:00 and scene S2 has time codes 00:00 through 05:25, whereas scene S3 has time codes 00:00 through 02:29 and scene S4 carries time codes 00:00 through 01:00. Then, the through time codes will be incremental and the through time code of a particular frame can be obtained by incrementing by 1 the time code of the immediately preceding frame throughout scenes S1 through S4 arranged in ascending order. Thus, the through time codes for scene S1 will be 00:00 through 10:00 and those for scene S2 will be 10:01 through 15:29, while those for scene S3 will be 16:00 through 18:29 and those for scene S4 will be 19:00 through 20:00.

Additionally, time codes are allocated according to the sequence of the frames to be reproduced and subjected to a so-called non-drop frame system in each scene. With a so-called drop frame system, time codes have to be reallocated to all the frames according to the rule of the drop frame system each time a scene is divided or scenes are combined together. With a non-drop frame system, on the other hand, a through time code can be obtained for each frame of each scene by adding a predetermined offset value to the time code of the frame within the scene.

Scenes are rearranged in any desired order in a programmed reproduction mode. In order for the incremental through time codes not to show any discrepancies in the programmed reproduction mode, they should be allocated according to the non-drop frame system.

Still additionally, the through time code system should be adapted to so-called 2-3 pull-down processing. Then, it will be safe for time codes to be displayed by counting the number of decoded pictures. FIG. 16 is a schematic illustration showing the relationship between frames and fields in 2-3 (3-2) pull-down processing. The 2-3 pull-down processing is a technique to be used for dividing pictures with a frequency of 24 Hz, typically those of a cinema film, as shown in (a) of FIG. 16 into top fields and bottom fields with a frequency of 60 Hz and a combination of a top field and a bottom field and that of two top fields and a bottom field or a top field and two bottom fields are alternately used for the respective frames of the film as shown in (b) of FIG. 16. With the 2-3 (or 3-2) pull-down processing, the picture count and the picture per se should be displayed in a synchronized fashion.

To select an editing point on an image source that is to be subjected to 2-3 pull-down processing, it should be driven to move slowly so that the editor can view it on a frame by frame basis. For example, assume that an in-point is selected for an editing operation as shown in FIG. 17, which is similar to FIG. 16. Then, a frame can be formed by a top field and a bottom field that are combined in such a way that contradicts the rule of 2-3 pull-down processing so that both the top field and the bottom field override respective two frames in the original image source having the frequency of 24 Hz. Since such frames by turn give rise to a field error at the time of the editing operation, the user should be prevented from specifying such frames for the editing operation.

This problem can be bypassed by sequentially showing frames that are arranged with the frequency of 24 frames/second according to the original sequence when they are viewed on a frame by frame basis as shown in FIG. 18, which is similar to FIG. 16. Then, the continuity of frames should be maintained when selecting in-points and out-points and also after the editing operation is over. This can be done by reducing the repeat_first_field of MPEG in the frame preceding that of an in-point to equal to 1 and repeating this operation for another field as shown in FIG. 19. Then, the field arrangement does not have to be changed after the editing point so that the modifying operation can be minimized.

When reproducing a scene (cut) from the head thereof, the time code of any picture of the scene can be determined by counting the number of the decoded pictures. However, when a scene is reproduced from a picture somewhere on the way, the time code of the head of the scene cannot be known. Then, picture numbers have to be referred to. When reproducing a scene from a picture at some point on the way, the picture number corresponding to the time of the start of the reproduction and the number of pictures from the head to the point of starting the reproduction are counted to determine the time code of the head of the scene. Then, the picture number is converted into the sector number where the picture is recorded (a table will be required for a lower layer to do this conversion) and the sector is accessed.

For handling an image source obtained by an operation of 2-3 pull-down processing in a manner as described above, picture numbers will be allocated in terms of 24 Hz and not 30 Hz. While picture numbers are allocated for every cycle of 30 Hz in the case of ordinary video signals, picture numbers should be allocated for every cycle of 24 Hz for an image source obtained from a cinema film. Otherwise, the above described mode of editing operations and data base files are applicable to such image sources.

Thus, in the case of an image source obtained as a result of an operation of 2-3 pull-down processing, the input video signal will be checked to find out if it has been subjected to 2-3 pull-down processing or not by the 2-3 pull-down detection circuit 15 of FIG. 1. When the input video signal is a digital signal, whether the signal has been subjected to 2-3 pull-down processing or not can be found by seeing the flag added to the digital signal. In the case of a digital video signal, a flag indicating that it is produced from a 30 Hz source or from a 24 Hz source is added to the video signal so that the encoder 10 can determine if picture numbers are to be allocated on the basis of 30 Hz or 24 Hz by seeing the flag. In the case of an analog video signal, the MPEG encoder 10 determines if picture numbers are to be allocated on the basis of 30 Hz or 24 Hz by seeing the difference between the top field and the bottom field. Finally, a technique that can be used for allocating time codes for reproducing pointers will be discussed below.

In a pointer reproduction mode where parts of cuts recorded on a disk media are gathered and reproduced, only a single type of time codes will be used and newly allocated. More specifically, several cuts will be gathered into a single cut (which is referred to as pointer reproduction program) and through time codes will be allocated to it. The time codes in each cut will be same as the original time codes used for it. Then, time codes can show discontinuities but they are necessary to know what part of the original cut is being reproduced currently. Thus, in the case of a pointer reproduction (programmed reproduction) mode, two different sets of time codes are desirably used so that the user can switch from one to the other whenever necessary.

As described above in detail, according to the invention, it is now possible to record a picture sequence in a manner that allow picture management and time code allocation to be realized accurately and reliably when editing a picture sequence by utilizing techniques such as cutting out (or erasing) a scene, inserting a scene (in the proper sense of the word) without overlaying the picture sequence with a scene and/or moving part of the picture sequence.

What is claimed is:

1. A method for recording a picture sequence on a disk-shaped recording medium at least on a picture by picture basis, characterized by comprising steps of:

allocating unique numbers to the pictures on the disk-shaped recording medium for one-to-one correspondence;

providing a file of editing information apart from the physical addresses of the substantive data on the disk-shaped recording medium;

editing the picture sequence by managing the numbers allocated to the respective pictures for one-to-one correspondence; and recording the file of editing information on the disk-shaped recording medium, wherein a picture stream subjected to 2-3 pull-down processing of converting pictures with a frame frequency of 24 Hz into pictures with a field frequency of 60 Hz, said frame frequency is used to manage the unique numbers allocated to said pictures on the basis of 24 Hz.

2. An apparatus for recording a picture sequence on a disk-shaped recording medium at least on a picture basis, characterized by comprising:

a number allocation means for allocating unique numbers to the pictures of the disk-shaped recording medium for one-to-one correspondence; and a file management means for managing a file of editing information apart from the physical addresses of the substantive data on the disk-shaped recording medium;

the picture sequence being edited by managing the numbers allocated to the respective pictures for one-to-one correspondence, the file of editing information being recorded on the disk-shaped recording medium, wherein a picture stream subjected to 2-3 pull-down processing of converting pictures with a frame frequency of 24 Hz into picture with a field frequency of 60 Hz, said frame frequency is used to manage the unique numbers allocated to said pictures on the basis of 24 Hz.

3. A method for reproducing a picture sequence recorded on a disk-shaped recording medium at least on a picture by picture basis, characterized by comprising steps of:

reading out a file of editing information from the disk-shaped recording medium apart from the physical addresses of the substantive data on the disk-shaped recording medium; and reproducing, at least partly, the pictures having respective unique numbers allocated thereto for one-to-one correspondence and managed by using the file of editing information on the basis of the file of editing information, wherein a picture stream subjected to 2-3 pull-down processing of converting pictures with a frame frequency of 24 Hz into pictures with a field frequency of 60 Hz, said frame frequency is used to manage the unique numbers allocated to said pictures on the basis of 24 Hz.

4. A method for reproducing a picture sequence recorded on a disk-shaped recording medium at least on a picture by picture basis, characterized by comprising:

a file reading means for reading out a file of editing information from the disk-shaped recording medium apart from the physical addresses of the substantive data on the disk-shaped recording medium; and a reproduction control means for reproducing, at least partly, the pictures having respective unique numbers allocated thereto for one-to-one correspondence and managed by using the file of editing information on the basis of the file of editing information, wherein a picture stream subjected to 2-3 pull-down processing of converting pictures with a frame frequency of 24 Hz Into pictures with a field frequency of 60 Hz, said frame frequency is used to manage the unique numbers allocated to said pictures on the basis of 24 Hz.

* * * * *